(12) United States Patent
Sawanobori et al.

(10) Patent No.: US 8,861,083 B2
(45) Date of Patent: Oct. 14, 2014

(54) BIREFRINGENCE PATTERN BUILDER

(75) Inventors: Osamu Sawanobori, Kanagawa (JP); Hideaki Itou, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 13/192,020

(22) Filed: Jul. 27, 2011

(65) Prior Publication Data
US 2012/0028193 A1    Feb. 2, 2012

(30) Foreign Application Priority Data

Jul. 28, 2010   (JP) .................................. 2010-169148

(51) Int. Cl.
*G02B 5/30*    (2006.01)
*G03F 7/00*    (2006.01)

(52) U.S. Cl.
CPC ............ *G02B 5/3083* (2013.01); *G02B 5/3016* (2013.01)
USPC ...................... 359/489.11; 430/321

(58) Field of Classification Search
USPC ................ 430/321; 349/75, 96, 114, 194; 359/489, 584, 489.1
See application file for complete search history.

(56) References Cited

U.S. PATENT DOCUMENTS

2008/0143926 A1* 6/2008 Amimori et al. ................. 349/75
2009/0291272 A1* 11/2009 Kaneiwa et al. ........... 428/195.1
2011/0019276 A1  1/2011 Kaneiwa et al.
2011/0043911 A1  2/2011 Kaneiwa et al.
2011/0234969 A1* 9/2011 Amimori et al. ............. 349/193

FOREIGN PATENT DOCUMENTS

| JP | 2009-069793 A | 4/2009 |
| JP | 2009-122662 A | 6/2009 |
| JP | 2009-175208 A | 8/2009 |
| JP | 2009-223190 A | 10/2009 |
| JP | 2010-076287 A | 4/2010 |
| WO | WO 2006/004897 A1 | 1/2006 |
| WO | WO 2009/093718 A2 | 7/2009 |
| WO | WO 2009/116660 A1 | 9/2009 |

OTHER PUBLICATIONS

European Search Report for EP 11175310 dated Dec. 27, 2011.
Japanese Office Action issued in Japanese Patent Application No. 2010-169148 on December 3, 2013.

* cited by examiner

*Primary Examiner* — Stewart Fraser
(74) *Attorney, Agent, or Firm* — Birch, Stewart, Kolasch & Birch, LLP

(57) ABSTRACT

A birefringence pattern builder used in a method of producing a patterned birefringent product including a step of patterned light exposure of an optically anisotropic layer and a step of heating the layer after the light exposure to 50° C. or higher but not higher than 400° C., which include the optically anisotropic layer, a support, and a laminate film in this order, is provided. The birefringence pattern builder prevents non-uniformity of functional layers that may generate in the production process, is useful for a production method that hardly causes nonuniformity in the patterned birefringent product even after a rolling-up step in the industrial production process, and enables a production of a thinner product.

19 Claims, 6 Drawing Sheets

BIREFRINGENCE PATTERN BUILDER

CROSS-REFERENCE TO RELATED APPLICATIONS

This application claims benefit of priority under 35 USC 119 to Japanese Patent Application No. 2010-169148 filed on Jul. 28, 2010, which is expressly incorporated by reference herein in its entirety.

TECHNICAL FIELD

The present invention relates to a birefringence pattern builder. More particularly, the present invention relates to a birefringence pattern builder that prevents nonuniformity of functional layers that may generate in the production process and enables a production of a thinner product, and a method of producing a patterned birefringent product that uses the birefringence pattern builder.

RELATED ART

A patterned birefringent product has a latent image that is invisible under an unpolarized light source, but becomes visible by using a polarizing filter. Some examples of the method of producing patterned birefringent products are described in Japanese Unexamined Patent Publications (KOKAI) Nos. 2009-69793, 2009-223190, and 2009-175208, the disclosures of which are expressly incorporated by reference herein in their entireties, and application of the products for the prevention of counterfeiting is proposed in these documents.

A patterned birefringent product includes an optically anisotropic layer for presenting birefringence pattern. It normally has a layer for supporting the optically anisotropic layer in addition. However, the support, which is normally on the most outer surface, may cause nonuniformity of other functional layers in the patterned birefringent product at the step of rolling up the sheet-like patterned birefringent product in the production process.

In addition, when the thickness of the support is reduced in the aim of fabrication of a thinner patterned birefringent product, handling at the fabrication process may be impaired.

SUMMARY OF THE INVENTION

The object of the present invention is to provide a production method that hardly causes nonuniformity in the patterned birefringent product even after a rolling-up step in the industrial production process, and a method of producing a patterned birefringent product that enables a production of a thinner product. Particularly, the object of the present invention is to provide a birefringence pattern builder that is used in such a production method.

The inventors of the present invention conducted intensive research and found out that the above object can be achieved by applying a laminate film to the support. On the basis of the above findings, the inventors of the present invention have achieved the present invention.

The present invention thus provides [1] to [12] below.

[1] A birefringence pattern builder which is used in a method of producing a patterned birefringent product comprising a step of patterned light exposure of an optically anisotropic layer and a step of heating the layer after the light exposure to 50° C. or higher but not higher than 400° C., said birefringence pattern builder comprising the optically anisotropic layer, a support, and a laminate film in this order.

[2] The birefringence pattern builder according to [1], wherein the laminate film comprises at least a laminate substrate and an adhesive layer.

[3] The birefringence pattern builder according to [2], wherein the average film thickness of the adhesive layer is 1.0 micrometer or more.

[4] The birefringence pattern builder according to any one of [1] to [3], wherein "the maximum sectional height Rt of the roughness curve" of the surface of the laminate film opposite to the surface bonded to the support is 1.0 micrometer or more.

[5] The birefringence pattern builder according to any one of [1] to [4], which comprises a reflective layer between the support and the optically anisotropic layer.

[6] The birefringence pattern builder according to any one of [1] to [5], wherein the optically anisotropic layer comprises an unreacted reactive group.

[7] The birefringence pattern builder according to any one of [1] to [6], wherein the patterned optically anisotropic layer is a layer that is formed of a composition comprising a liquid-crystal compound having at least one reactive group.

[8] The birefringence pattern builder according to [7], wherein the liquid crystalline compound has two or more types of reactive groups each of which has different polymerization condition.

[9] The birefringence pattern builder according to [8], wherein the liquid crystalline compound has a radically reactive group and a cationically reactive group.

[10] The birefringence pattern builder according to [9], wherein the radically reactive group is acrylic group and/or methacrylic group and the cationically reactive group is vinyl ether group, oxetanyl group, and/or epoxy group.

[11] A method of producing a patterned birefringent product, wherein the birefringence pattern builder according to any one of [1] to [10] is used.

[12] A method of producing a patterned birefringent product, which comprises steps (1) to (4) below:
(1) forming an optically anisotropic layer on the surface of a support with a laminate film bonded thereto, which is opposite to the surface to which the laminate film is bonded;
(2) subjecting the optically anisotropic layer to patterned light exposure;
(3) heating the layer after the patterned light exposure to 50° C. or higher but not higher than 400° C.; and
(4) delaminating the laminate film.

Effect of the Invention

The present invention provides a birefringence pattern builder that prevents nonuniformity of functional layers that may generate in the production process. The support does not need to be thickened in the aim of maintaining the dynamic stability required in the production process. Thus, a production of a thinner product as a patterned birefringent product becomes possible.

MODES OF CARRYING OUT THE INVENTION

Figure 1:
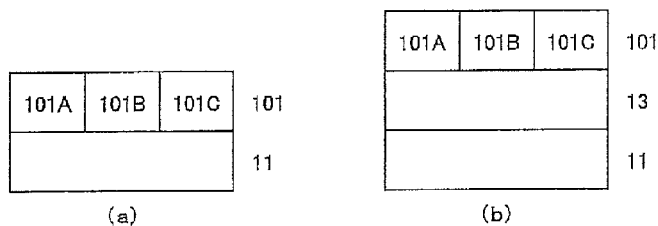
FIG. 1: Diagrams showing typical structures of patterned birefringent products (transmissive-type and reflective type) each having a patterned optically anisotropic layer on a support.
Figure 2:
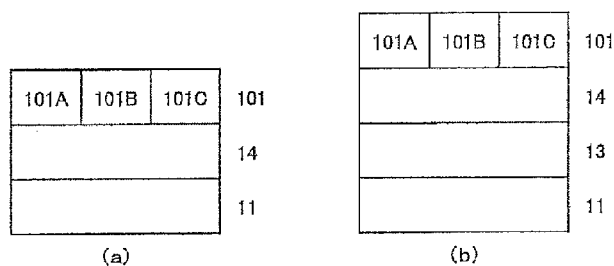
FIG. 2: Diagrams showing typical structures of patterned birefringent products each having an orientation layer.
Figure 3:
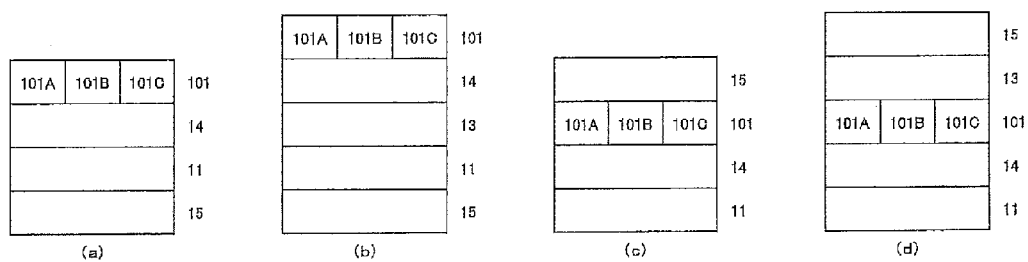
FIG. 3: Diagrams showing typical structures of patterned birefringent products each having an adhesive layer.
Figure 4:
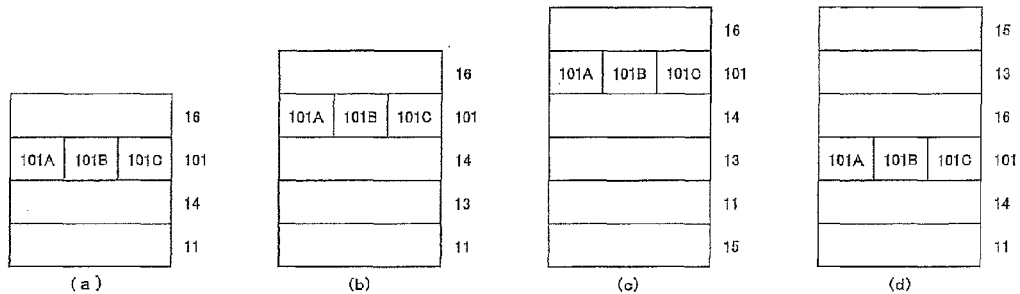
FIG. 4: Diagrams showing typical structures of patterned birefringent products each having a printed layer.
Figure 5:
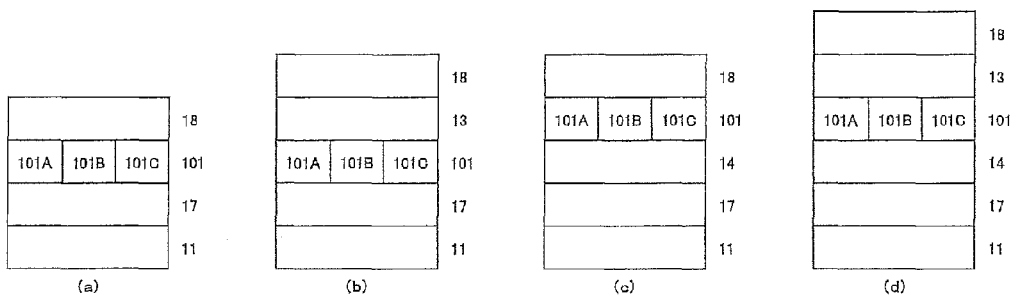
FIG. 5: Diagrams showing typical structures of transfer-type patterned birefringent products each having a dynamic property control layer and a transfer layer.
Figure 6:
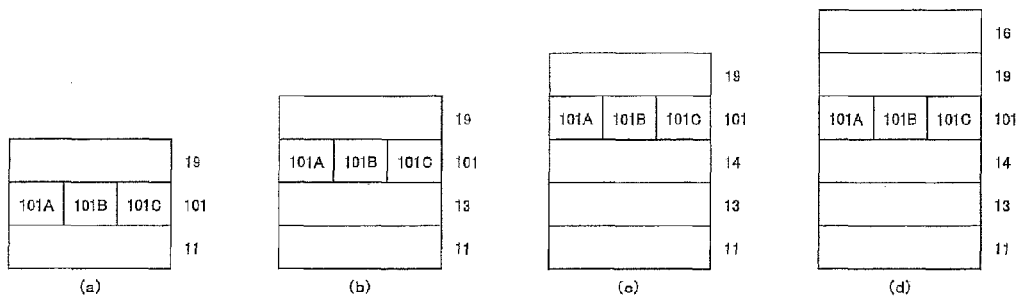
FIG. 6: Diagrams showing typical structures of patterned birefringent products each having an additive layer.

The present invention is described in detail below.

In the present description, a "to" is employed to mean that the upper limit value and lower limit value of the numeric values indicated before and after it are included.

In the present description, the terms "phase differential," "retardation," and "Re" denote in-plane retardation. The in-plane retardation (Re θ) can be measured by the spectral phase differential method by conversion from a transmission or reflectance spectrum to a phase differential by the method described in the Journal of the Optical Society of America, Vol. 39, p. 791-794 (1949) or Japanese Unexamined Patent Publication (KOKAI) No. 2008-256590, the disclosures of which are expressly incorporated by reference herein in their entireties. The above references are measurement methods that employ transmission spectra. Since the light passes through the optically anisotropic layer twice, particularly in the case of reflection, half of the phase differential converted from the reflection spectrum can be employed as the phase differential of the optically anisotropic layer. Re0 is the frontal retardation. Re(λ) is the retardation employing light of wavelength λ nm as the measurement beam. The retardation or Re in the present description means the retardation measured at the wavelengths of 611±5 nm, 545±5 nm, and 435±5 nm for R, G, and B, and means the retardation measured at a wavelength of 545±5 nm or 590±5 nm when no reference to color is given.

In the present description, use of the word "essentially" in reference to an angle means that the difference from the precise angle falls within a range of less than ±5°. The difference from the precise angle is preferably less than 4°, and is more preferably less than 3°. In reference to retardation, the word "essentially" means a difference in retardation of within ±5°, inclusive. A "retardation of essentially 0" means a retardation of 5 nm or less. Unless specifically stated otherwise, the wavelength at which a refractive index is measured refers to any wavelength within the visible light region. In the present description, the term "visible light" refers to light with a wavelength of from 400 to 700 nm.

[The Definition of a Birefringence Pattern]

Broadly defined, a birefringence pattern is the two-dimensional in-plane or three-dimensional patterning of two or more domains of differing birefringence. In particular, two-dimensionally within a plane, the birefringence is defined by the two parameters of the direction of the slow axis in which the refractive index peaks in-plane and the magnitude of retardation within the domain. For example, in-plane oriented defects and the inclination distribution of liquid crystals in the direction of thickness in a phase differential film based on a compound with liquid crystallinity can also be said to constitute a birefringence pattern in a broad sense. However, in a narrow sense, patterning that is achieved by intentionally controlling birefringence based on a predetermined design is desirably defined as a birefringence pattern. In particular, a birefringence pattern in the present invention can be a pattern that is formed of domains of differing magnitudes of retardation in which the direction of the slow axis is constant. Unless specifically stated otherwise, the birefringence pattern can be comprised of multiple layers, and the boundaries between the patterns of the multiple layers can align or be different.

[The Patterned Birefringent Product]

In the present description, the phrase "patterned birefringent product" means a product having two or more regions of differing birefringence. The patterned birefringent product preferably comprises three or more regions of differing birefringence. Individual regions of identical birefringence can be continuous or discontinuous in shape.

FIGS. 1 to 6 are examples of patterned birefringent products. The patterned birefringent products comprise at least one patterned optically anisotropic layer 101. In the present description, the phrase "patterned optically anisotropic layer" means an optically anisotropic layer in which regions of differing birefringence are present in the form of a pattern. The patterned optically anisotropic layer can be readily fabricated using the birefringence pattern builder described further below, for example, but the method of fabrication is not specifically limited other than that it yield a layer comprised of regions of different birefringence present in the form of a pattern.

In the figures, regions of differing birefringence are illustrated as 101A, 101B, and 101C.

The patterned birefringent products shown in FIGS. 1(a) and (b) show the structures of the most basic transmitting-type and reflecting-type patterned birefringent products.

In the case of the transmitting type, the light source and the measurement point are on opposite sides of the patterned birefringent product, that is, the patterned optically anisotropic layer. Light exiting from a polarizing light source fabricated with a polarizing filter or the like passes through the patterned birefringent product, and light of differing elliptical polarization within the plane is caused to exit, passing through the polarizing filter and rendering information visible on the measurement point side. Here, the polarizing filter can be a linearly polarizing filter, a circularly polarizing filter, or an elliptically polarizing filter. The polarizing filter itself can have a birefringence pattern or dichroic pattern.

In the case of the reflecting type, both the light source and the measurement point are positioned on one side as viewed from the patterned optically anisotropic layer, and a reflective layer is present on the surface on the opposite side as viewed from the patterned optically anisotropic layer of the patterned birefringent product. Light exiting a polarizing light source fabricated with a polarizing filter or the like passes through the patterned birefringent product, reflects off the reflective layer, and passes back through the patterned birefringent product. Light of differing elliptical polarization within the plane is caused to exit, and passes through the polarizing filter again on the measurement point side, rendering information visible. Here, the polarizing filter can be a linearly polarizing filter, a circularly polarizing filter, or an elliptically polarizing filter. The polarizing filter itself can have a birefringence pattern or dichroic pattern. A single polarizing filter can be employed as a light source and for measurement. The reflective layer can also serve as a highly reflective holographic layer, electrode layer, or the like.

The reflective layer can also be a semi-transmissive-half-reflective layer that partially reflects light and partially passes light. In that case, not only can the patterned birefringent product render visible both transmitted and reflected images, but also general information such as text and images present on the bottom side of the semi-transmissive-half-reflective layer of the patterned birefringent product can be recognized from the top side of the optically anisotropic layer without any filters. The reflective layer can be on the optically anisotropic layer side or the opposite side of the support, but is preferably on the optically anisotropic layer side because this places few limitations on the support.

The patterned birefringent product shown in FIG. 2(a) and (b) are examples each having an orientation layer 14. When employing a layer formed of an optically anisotropic layer that has been fixed by polymerization by heating or irradiation with light after coating and drying a solution containing a liquid-crystal compound to form a liquid-crystal phase as patterned optically anisotropic layer 101, orientation layer 14 functions to facilitate orientation of the liquid-crystal compound.

FIGS. 3(a) to (d) are examples of patterned birefringent products each having an adhesive layer 15. An adhesive layer becomes necessary when fabricating a patterned birefringent product such as a seal label. Generally, mold-releasing paper or a mold-releasing film is bonded to the adhesive layer. This is preferable from a practical perspective. Further, it can be a special adhesive layer such that any attempt to peel it off once bonded to the targeted material causes adhesive to remain on the target item in a specific pattern.

FIGS. 4(a) to (d) are examples of patterned birefringent products containing printed layers. The printed layer is generally one that produces a visible image, and superposed on an invisible birefringence pattern. It can be combined with invisible security printing by means of a UV fluorescent dye or IR dye. The printed layer can be above or beneath the optically anisotropic layer, or can be on the opposite side of the support from the optically anisotropic layer. If the printed layer transmits light, when rendering a latent image based on a birefringence pattern visible with a filter, the print and latent image become visible in combination.

FIGS. 5(a) to (d) are examples of transfer-type patterned birefringent products each having a dynamic property control layer 17 and a transfer layer 18. A patterned birefringent product produced by a method including a transfer step, for example, may have a dynamic property control layer and a transfer layer. A dynamic property control layer is a layer that controls the separation property so that an optically anisotropic layer is transferred to the targeted material when prescribed conditions are satisfied when the transfer layer is brought into contact with the targeted material. A separation layer imparting a separating property to an adjacent layer and a cushion layer that increases transferability by applying uniform stress during transfer are examples of dynamic property control layers. In addition to common adhesives and contact adhesives, examples of the transfer layer include hot melt contact adhesives that develop adhesiveness when heated, UV contact adhesives that develop adhesiveness when exposed to UV radiation, and layers on which the pattern to be transferred is printed in the form of a contact adhesive. Although not shown in the figure, such a layer can also function as both an orientation layer and a dynamic property control layer. A transfer-type patterned birefringent product having no reflective layer can be transferred to a targeted material having a reflective layer to be used as a reflective-type product.

The patterned birefringent products shown in FIGS. 6(a) to (d) have additive layers 19. Additive layers include layers for subsequently adding a plasticizer or a photopolymerization initiator to an optically anisotropic layer as set forth further below, hardcoat layers for surface protection, water-repellent layers to keep fingerprints from sticking and to prevent doodling with magic markers, electrically conductive layers imparting touch panel properties, blocking layers that make the product invisible to an IR camera by not transmitting IR radiation, circularly polarized light-selective reflective layers in which an image is made to disappear by a circularly polarized light filter by not passing left or right circularly polarized light, photosensitive layers imparting photosensitivity to an optically anisotropic layer, antenna layers functioning as RFID antennas, immersion-detecting layers that detect immersion in water by changing color or the like when immersed in water, thermotropic layers that change color based on temperature, coloration-filtering layers that control the colors of latent images, transmitting-type polarized layers in which latent images become visible when a switch is made between polarized light/unpolarized light on the light source side, magnetic layers that impart magnetic recording properties, as well as layers that function as matte layers, scattering layers, lubricating layers, photosensitive layers, antistatic layers, and resist layers.

Figure 7:
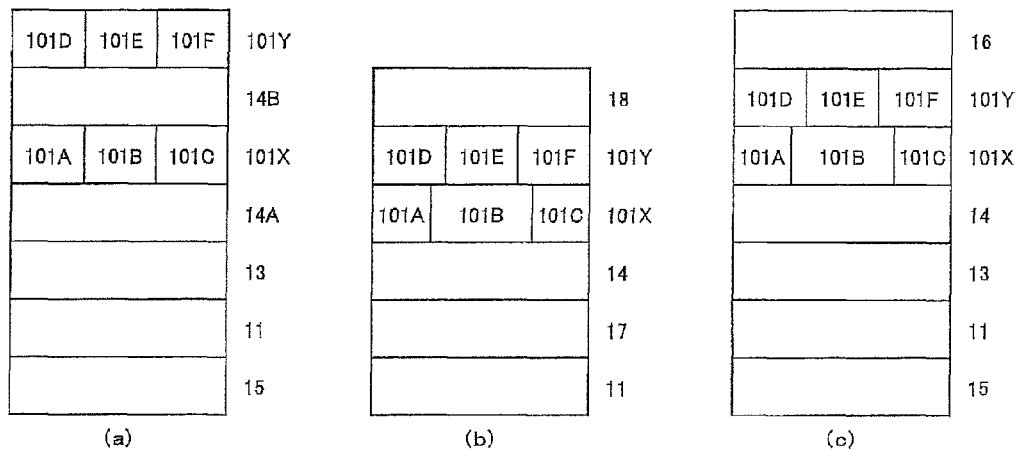
FIG. 7: Diagrams showing typical structures of patterned birefringent products each having multiple patterned optically anisotropic layers.

The patterned birefringent products shown in FIGS. 7(a) to (c) have multiple patterned optically anisotropic layers. The in-plane slow axes of the multiple optically anisotropic layers can be identical or different, but are preferably different. The regions of multiple optically anisotropic layers of differing birefringence can align or be different. Although not shown, there can be three or more patterned optically anisotropic layers. By providing two or more optically anisotropic layers of mutually differing retardation or slow axes and imparting independent patterns to each, latent images with various functions can be formed.

[The Birefringence Pattern Builder]

A birefringence pattern builder refers to a material for fabricating a birefringence pattern that can be used to fabricate a patterned birefringent product through a series of prescribed steps.

The birefringence pattern builder can normally be in the form of a film or sheet. The birefringence pattern builder of the present invention comprises an optically anisotropic layer, a support, and a laminate film. The birefringence pattern builder can further comprise functional layers imparting various secondary functions. Examples of functional layers include an orientation layer, a reflective layer, and an adhesives layer. A birefringence pattern builder that is employed as a transfer material, or a birefringence pattern builder that is fabricated using a transfer material can comprise a temporary support or a dynamic property control layer.

Figure 8:
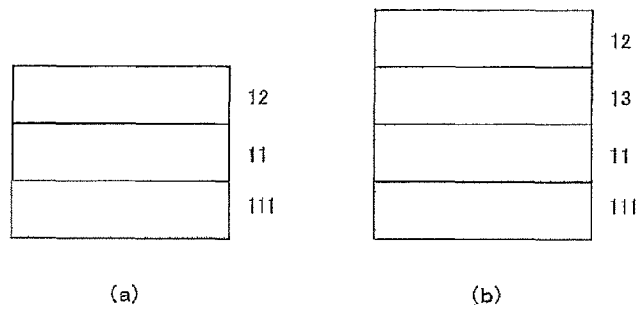
FIG. 8: Diagrams showing typical structures of basic birefringence pattern builders.

The birefringence pattern builder shown in FIG. 8(a) and (b) are examples of birefringence pattern builders each having an optically anisotropic layer 12 on a support applied with a laminate film 111. The birefringence pattern builder of the present invention has a laminate film on the surface of the support that is opposite to the surface to which the optically anisotropic layer 12 is provided. Although not shown in the figures, the laminate film is generally formed of a laminate substrate and an adhesive layer for bonding the laminate substrate and the support.

The optically anisotropic layer is a birefringent layer, and can be in the form of a layer in which a uniaxially or biaxially-stretched polymer or an oriented liquid-crystal compound has been fixed, an organic or inorganic single-crystal layer of aligned orientation, or the like. The optically anisotropic layer is preferably a layer that has the function of permitting control of the optical anisotropy at will through patterned light exposure such as exposure to light through a photomask or digital exposure; patterned heating such as with a hot stamp, thermal head, or infrared light laser beam exposure; stylus drawing by mechanically applying pressure or shear with a pin or pen; printing a reactive compound; or the like. This is because an optically anisotropic layer having such a function facilitates the obtaining of a patterned optically anisotropic layer by the method set forth further below. The use of patterned light exposure such as exposure to light through a photomask or scanning optical exposure is preferable for pattern formation. The patterning step can be combined with bleaching, development, or the like by means of heat or chemicals as needed in forming a pattern. In that case, heat bleaching and development are preferable because they place few limitations on the support.

Figure 9:
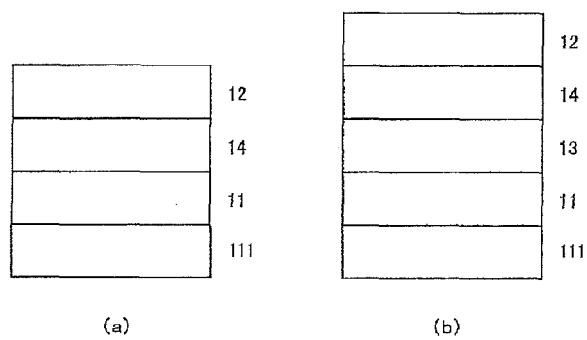
FIG. 9: Diagrams showing typical structures of birefringence pattern builders each having an orientation layer.

FIGS. 9(a) and (b) are examples of birefringence pattern builders with an orientation layer 14.

Figure 10:
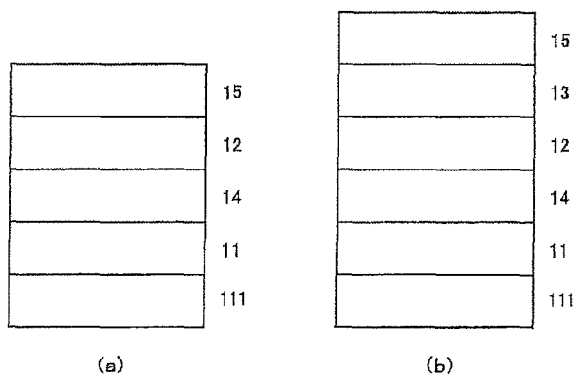
FIG. 10: Diagrams showing typical structures of birefringence pattern builders each having an adhesive layer.

FIGS. 10(a) and (b) are examples of birefringence pattern builders having an adhesive layer 15.

Figure 11:
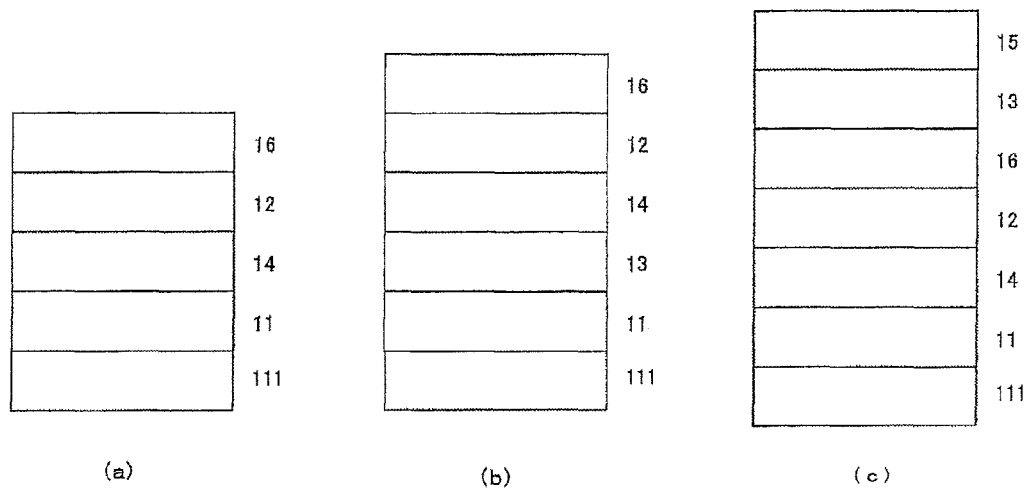
FIG. 11: Diagrams showing typical structures of birefringence pattern builders each having a printed layer.
Figure 12:
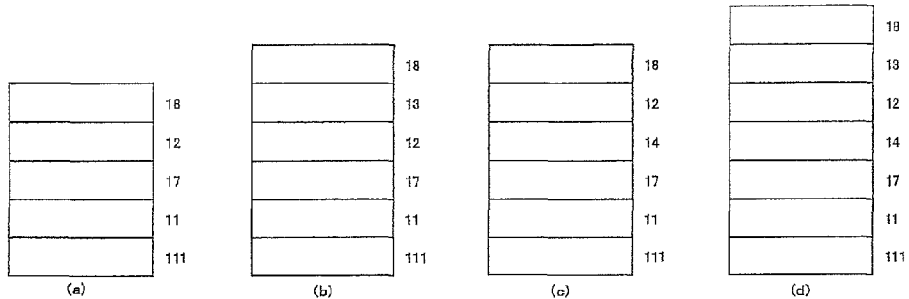
FIG. 12: Diagrams showing typical structures of transfer-type birefringence pattern builders each having a dynamic property control layer and a transfer layer.
Figure 13:
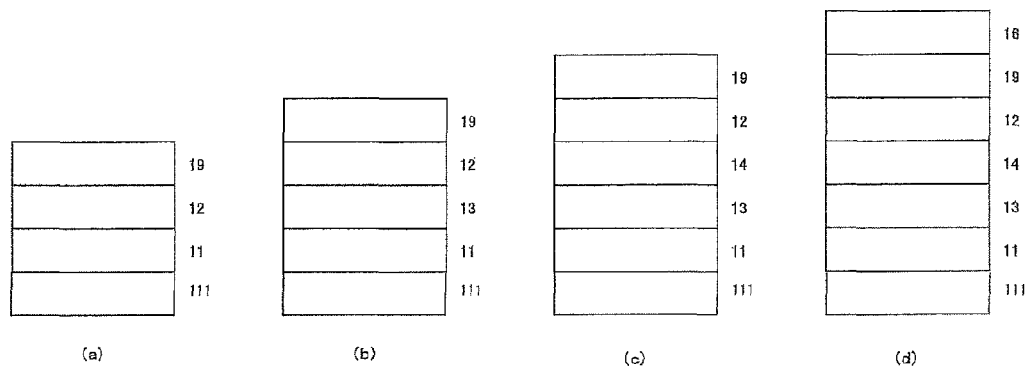
FIG. 13: Diagrams showing typical structures of birefringence pattern builders each having an additive layer.

FIGS. 11(a) to (c) are examples of birefringence pattern builders having a printed layer 16.

FIGS. 12(a) to (d) are examples of transfer-type birefringence pattern builders having a dynamic property control layer 17 and a transfer layer 18.

FIGS. 13(a) to (d) are examples of birefringence pattern builders having an additive layer 19.

Figure 14:
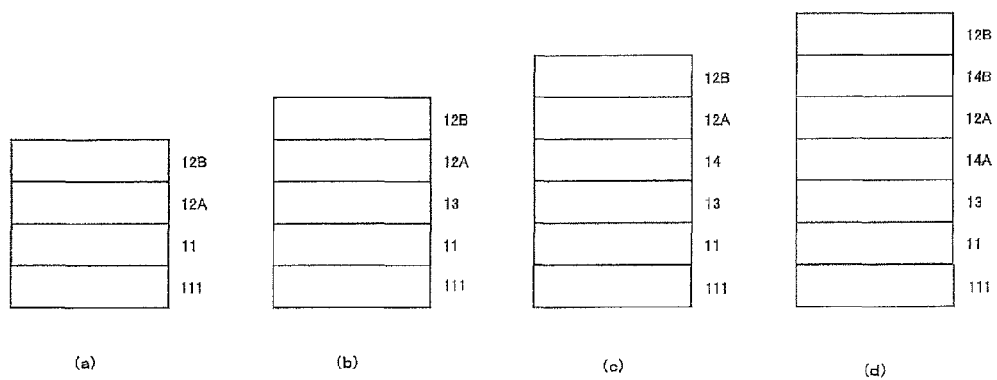
FIG. 14: Diagrams showing typical structures of birefringence pattern builders each having multiple patterned optically anisotropic layers.

The birefringence pattern builders shown in FIGS. 14(a) to (d) have multiple optically anisotropic layers. The in-plane show axes of the multiple optically anisotropic layers can be identical or different, but are preferably different. Although not shown, there may be three or more optically anisotropic layers. When forming optically anisotropic layers of liquid-crystal compounds, the presence of an orientation layer is preferable. More preferably, the orientation layer can be omitted, as shown in FIG. 14(c), by having an optically anisotropic layer double as an orientation layer. By employing a transfer-type birefringence pattern builder, the fabrication of a product having multiple layers with birefringence patterns can be facilitated.

For example, when employing the birefringence pattern builder described in Japanese Unexamined Patent Publication (KOKAI) No. 2009-175208, the disclosure of which is expressly incorporated by reference herein in its entirety, the retardation in irradiated portions can be controlled by the level of light exposure, making it possible to achieve a retardation in unexposed portions of essentially 0.

The birefringence pattern builder, the method of manufacturing a patterned birefringent product employing the birefringence pattern builder, materials and a method of fabricating a patterned birefringent product, and the like will be described in detail below. The present invention is not limited to the embodiments described below, and implementations of other embodiments are possible by referring to the description set forth below and to conventionally known methods.

[The Optically Anisotropic Layer]

The optically anisotropic layer in the birefringence pattern builder is a layer having optical properties such that the retardation in at least one direction of incidence is essentially 0 when measured, that is, a layer that is not isotropic.

Examples of the optically anisotropic layer in the birefringence pattern builder are a layer containing at least one monomer or oligomer and their cured products; a layer containing at least one polymer; and a layer containing at least one organic or inorganic single crystal.

An optically anisotropic layer containing a polymer is preferred from the perspective of being able to satisfy various different requirements, such as birefringence, transparency, resistance to solvents, toughness, and flexibility. The polymer in the optically anisotropic layer preferably contains an unreacted reactive group. When crosslinking of polymer chains occurs due to the reaction of unreacted reactive groups when exposed to light, the degree of crosslinking of polymer chains varies due to exposure to light under different conditions. As a result, the retardation level changes, which is considered to facilitate the formation of a birefringence pattern.

The optically anisotropic layer is preferably solid at 20° C., more preferably solid at 30° C., and still more preferably, solid at 40° C. This is because the application of other functional layers, transfer and bonding to the support, and the like are facilitated when the optically anisotropic layer is solid at 20° C. For the application of other functional layers, the optically anisotropic layer preferably has resistance to solvents. In the present description, the phrase "has resistance to solvents" means that the retardation following immersion for two minutes in the target solvent falls within a range of 30% to 170%, preferably falls within a range of 50% to 150%, and optimally falls within a range of from 80% to 120% of the retardation prior to the immersion. Examples of target solvents are water, methanol, ethanol, isopropanol, acetone, methyl ethyl ketone, cyclohexanone, propylene glycol monomethyl ether acetate, N-methylpyrrolidone, hexane, chloroform, and ethyl acetate. Preferred examples are acetone, methyl ethyl ketone, cyclohexanone, propylene glycol monomethyl ether acetate, and N-methylpyrrolidone. Optimal examples include methyl ethyl ketone, cyclohexanone, propylene glycol monomethyl ether acetate, and mixed solvents thereof.

The optically anisotropic layer may have a retardation of 5 nm or higher at 20° C. A retardation of 10 nm or higher and 10,000 nm or lower is preferable, and a retardation of 20 nm or higher and 2,000 or lower is optimal. At a retardation of 5 nm or lower, the formation of a birefringence pattern may become difficult. When the retardation exceeds 10,000 nm, the error increases and it sometimes becomes difficult to achieve a precision permitting practical use.

The method of preparing the optically anisotropic layer is not specifically limited. Examples include: the preparation method of applying and drying a solution containing a liquid-crystal compound having at least one reactive group to form a liquid-crystal phase, and then heating it or irradiating it with light to fix it by polymerization; the preparation method of stretching a layer in which a monomer having two or more reactive groups has been fixed by polymerization; the method of stretching a layer comprised of a polymer having a reactive group in a side chain; and the method of stretching a layer comprised of a polymer and then using a coupling agent or the like to introduce a reactive group. As set forth further below, the optically anisotropic layer can be formed by transfer. The thickness of the optically anisotropic layer is preferably 0.1 to 20 micrometers and more preferably 0.5 to 10 micrometers.

[An Optically Anisotropic Layer in which a Composition Containing a Liquid-Crystal Compound has been Oriented and Fixed]

The case where the optically anisotropic layer is prepared by applying and drying a solution containing a liquid-crystal compound having at least one reactive group to form a liquid-crystal phase, and then heating it or irradiating it with light to fix it by polymerization will be described below. This preparation method is preferable to the method of preparation by stretching a polymer to obtain an optically anisotropic layer set forth further below in that it readily yields an optically anisotropic layer of equivalent retardation in a thin film.

[The Liquid-Crystal Compound]

Generally, liquid-crystal compounds can be grouped into rod-like-types and discotic-types based on their shape. Each of these also comprises low molecular and high molecular types. "High molecular" generally refers to a degree of polymerization of 100 or higher (High Molecular Physics—Phase Transition Dynamics, Masao Doi, p. 2, Iwanami Shoten, 1992), the disclosure of which is expressly incorporated by reference herein in its entirety. In the present invention, any liquid-crystal compound can be employed, but the use of a rod-like liquid-crystal compound is preferred.

In the present description, it is not necessary for a compound having liquid crystallinity to be contained in the layer that is formed from a composition containing a liquid-crystal compound. For example, the layer may contain a high-molecular weight compound, no longer exhibiting liquid crystallinity, which is formed by carrying out polymerization or crosslinking reaction of the low molecular liquid-crystal compound having a reactive group capable of thermal reaction or photo reaction under heating or under irradiation of light. Further, two or more rod-like liquid-crystal compounds, two or more discotic liquid-crystal compounds, or a mixture of a rod-like liquid-crystal compound and a discotic liquid-crystal compound can be employed as the liquid-crystal compound. Since temperature change and humidity change can be reduced, use of discotic liquid-crystal compounds or rod-like liquid-crystal compounds having reactive groups is preferable. It is of still greater preference for at least one of them to contain two or more reactive groups per liquid-crystal molecule. In the case of a mixture of two or more liquid-crystal compounds, at least one of them preferably have two or more reactive groups.

A liquid-crystal compound having two or more reactive groups with different crosslinking mechanisms is preferably employed. An optically anisotropic layer containing a polymer having an unreacted reactive group can then be prepared by causing just a portion of the two or more reactive groups to polymerize through the selection of conditions. The crosslinking mechanism is not specifically limited, and can consist of a condensation reaction, hydrogen bonding, polymerization, or the like. Of the two or more mechanisms, at least one is preferably polymerization, and the use of two or more different forms of polymerization is preferable. Generally, not only the vinyl groups, (meth)acrylic groups, epoxy groups, oxetanyl groups, and vinyl ether groups that are employed in polymerization, but also hydroxyl groups, carboxylic acid groups, amino groups, and the like can be employed in the crosslinking reaction.

In the present description, the phrase "a compound having two or more reactive groups with different crosslinking mechanisms" means a compound that can be crosslinked in stages with different crosslinking reaction steps. In the crosslinking reaction step of each stage, a reactive group reacts as a functional group according to its respective crosslinking mechanism. Further, for example, in the case of a polymer such as a polyvinyl alcohol having a hydroxyl group in a side chain, when the hydroxyl group in the side chain has been crosslinked with an aldehyde or the like following the polymerization reaction that polymerizes the polymer, two or more different crosslinking mechanisms have been employed. However, in the present description, a compound having two or more different reactive group preferably means a compound having two or more different reactive groups in a layer at the point where the layer has been formed on a support or the like, and the reactive groups therein can be subsequently crosslinked in stages. As a particularly preferable embodiment, the use of a liquid-crystal compound having two or more polymerizable groups is preferred. The reaction conditions causing crosslinking in stages can be different temperatures, different wavelengths of light (the radiation of light), or different polymerization mechanisms. From the perspective of separating the reaction, the use of different polymerization mechanisms is preferred, and control by means of the type of initiator employed is preferable. The combination of a radically polymerizable group and a cationically polymerizable group as polymerization mechanisms is preferred. A combination in which the radically polymerizable group is a vinyl group or (meth)acrylic group, and the cationically polymerizable group is an epoxy group, oxetanyl group, or vinyl ether group is particularly preferred because of the ease of controlling the polymerization properties. Examples of reactive groups are given below.

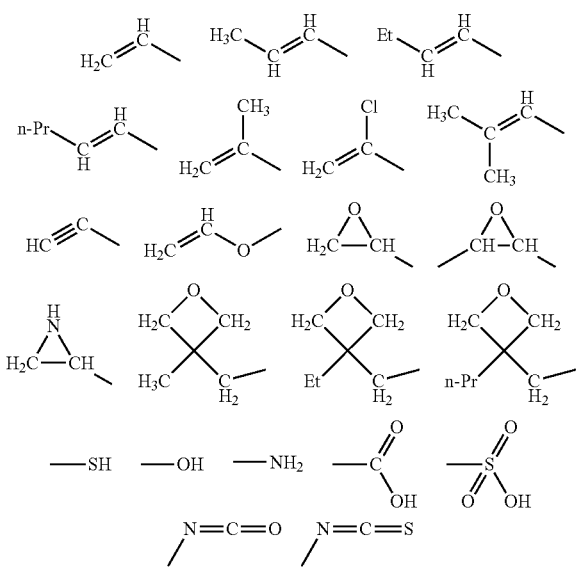

Azomethines, azoxy compounds, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, and alkenyl cyclohexylbenzonitriles are preferably employed as rod-like liquid-crystal compounds. Not only low molecular liquid-crystal compounds such as the above, but high molecular liquid-crystal compounds can also be employed. These high molecular liquid-crystal compounds are obtained by polymerizing low molecular rod-like liquid-crystal compounds having a reactive group. Examples of rod-like liquid-crystal compounds are those described in Japanese Unexamined Patent Publication (KOKAI) No. 2008-281989, Published Japanese Translation (TOKUHYO) Heisei No. 11-513019 of a PCT International Application (WO97/00600), and Published Japanese Translation (TOKUHYO) No. 2006-526165 of a PCT International Application (WO2004/090025), the disclosures of which are expressly incorporated by reference herein in their entireties.

Specific examples of rod-like liquid-crystal compounds are given below. However, the present invention is not limited thereto. The compounds represented by general formulas (I) can be synthesized by the method described in Published Japanese Translation (TOKUHYO) Heisei No. 11-513019 of a PCT International Application (WO97/00600), the disclosure of which is expressly incorporated by reference herein in its entirety.

I-1

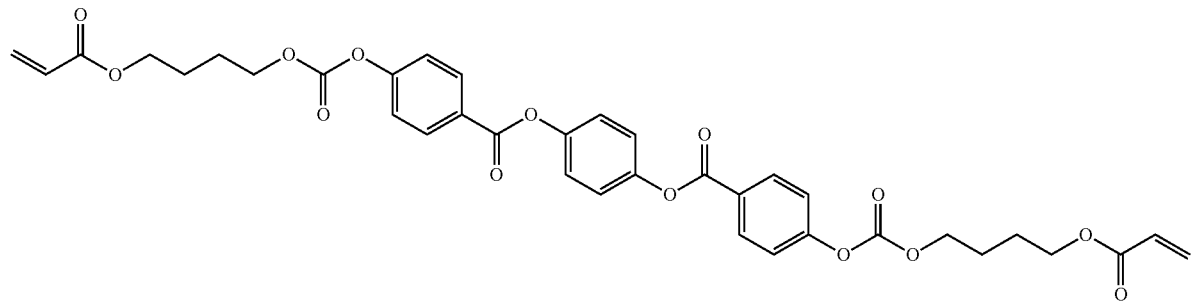

I-2

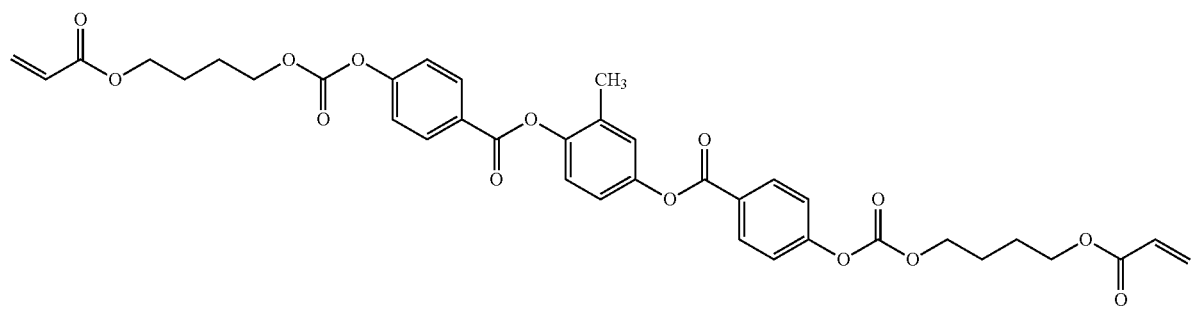

I-3

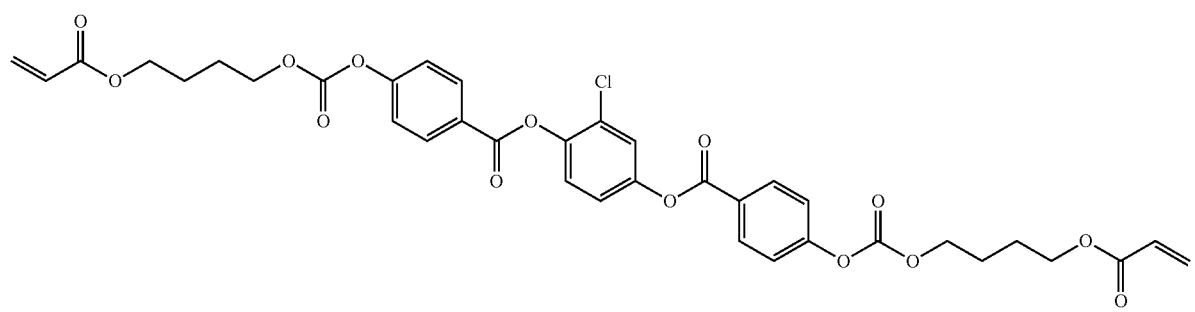

I-4

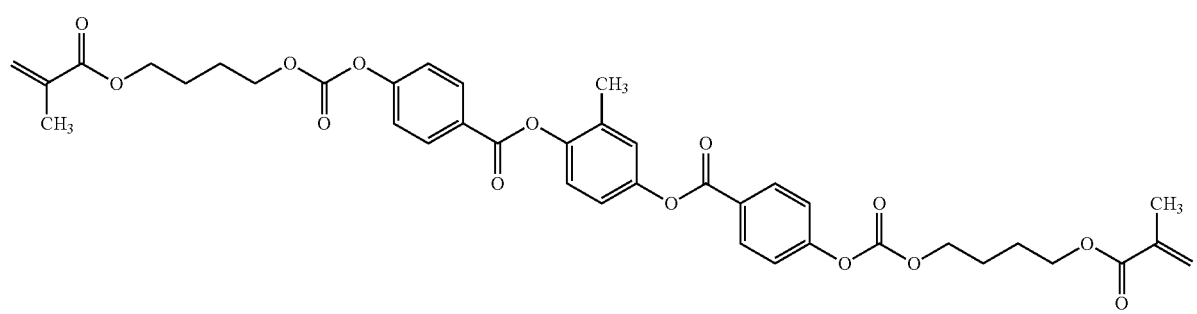

-continued
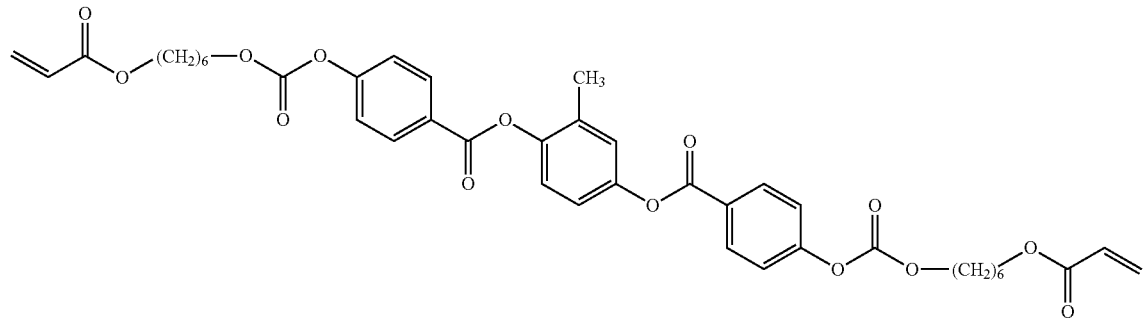
I-5
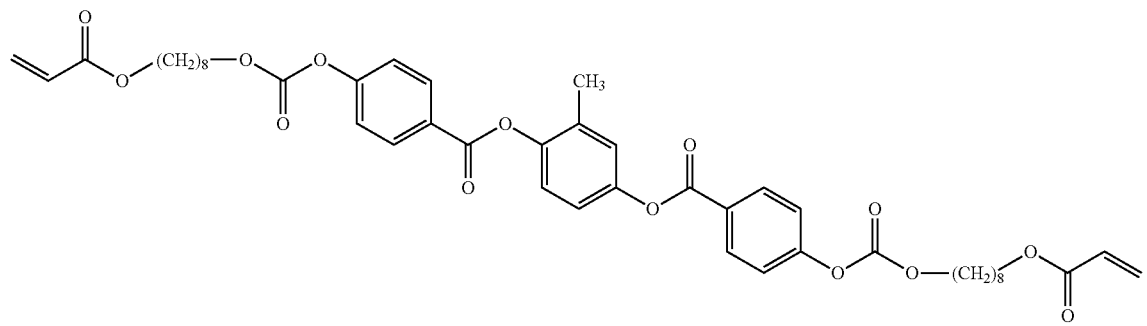
I-6
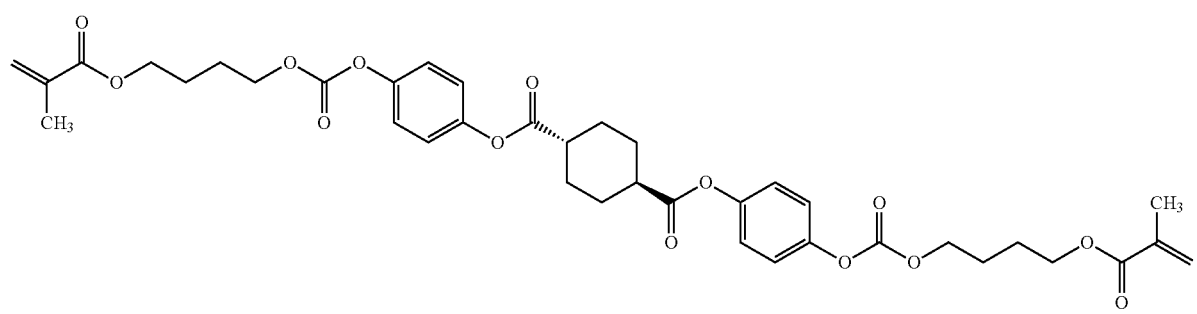
I-7
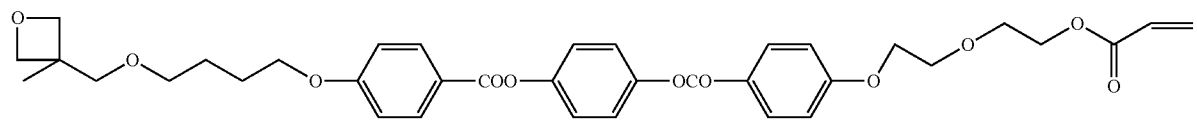
I-8
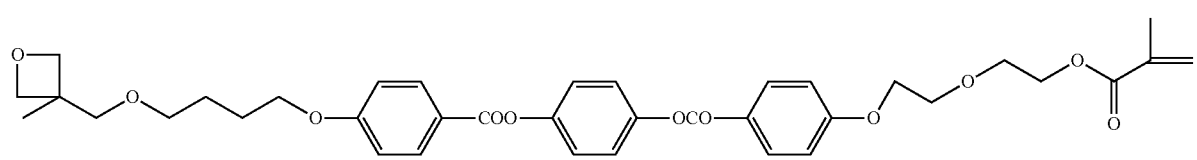
I-9
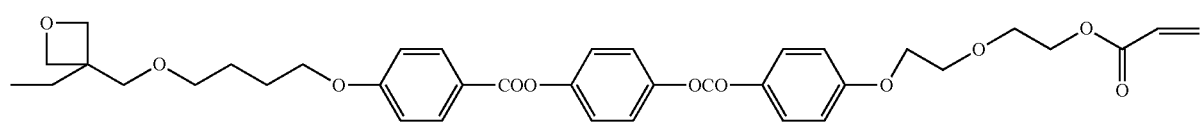
I-10
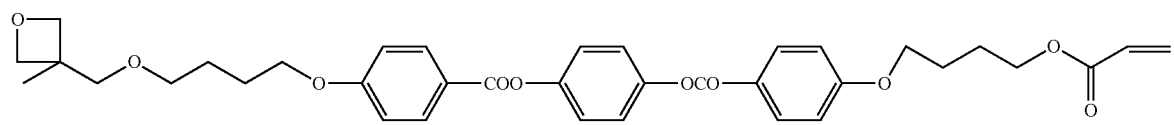
I-11

-continued
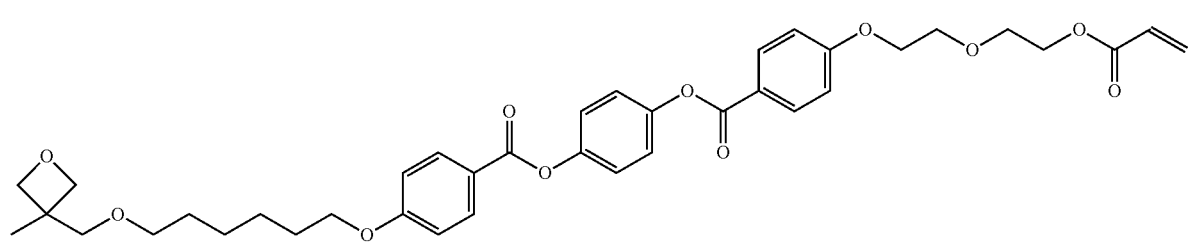
I-12
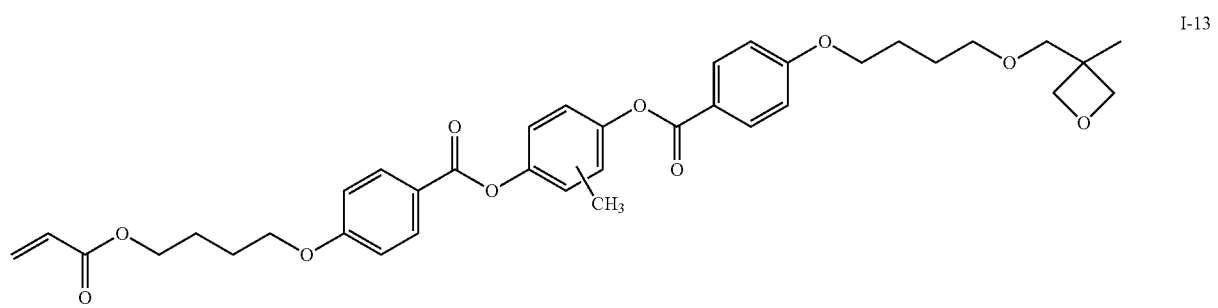
I-13
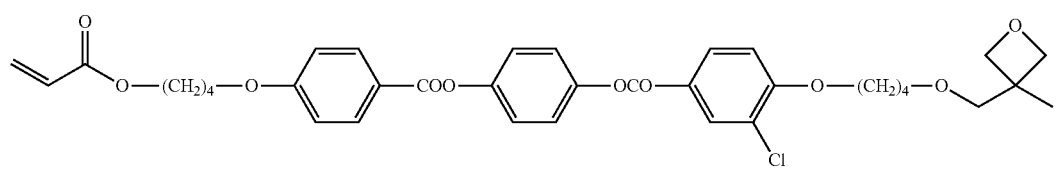
I-14
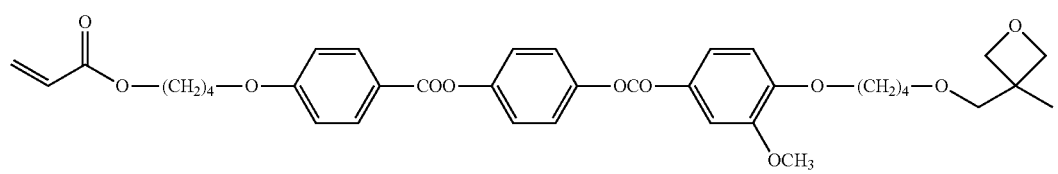
I-15
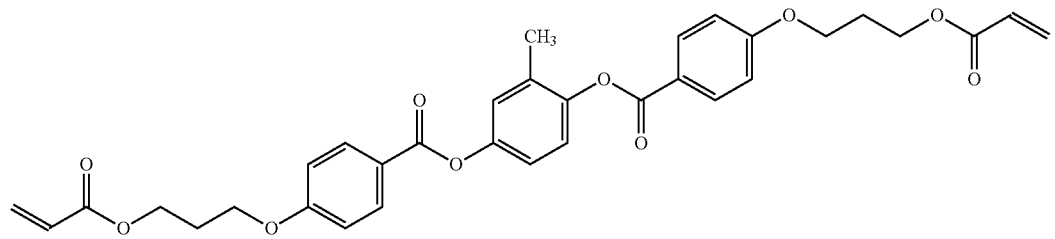
I-16
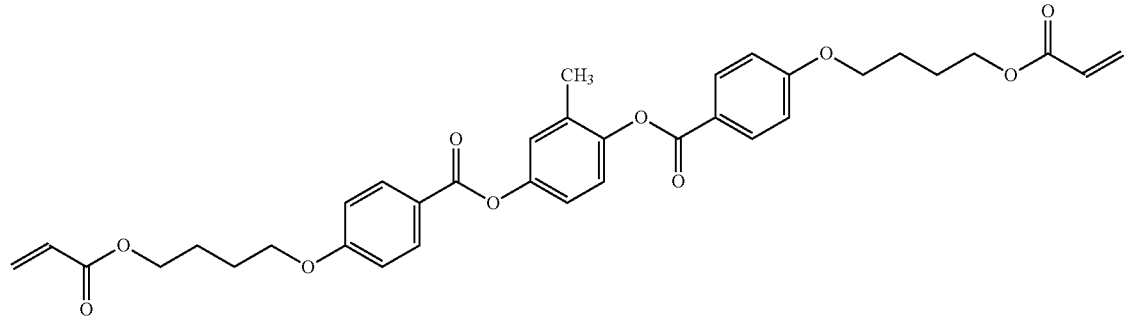
I-17

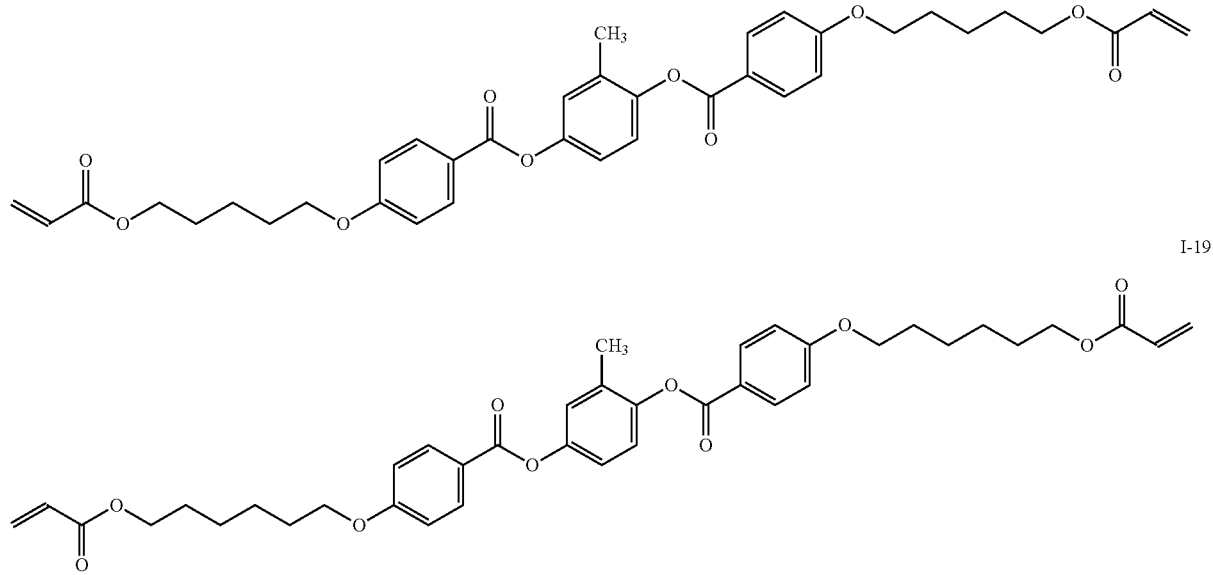

I-18

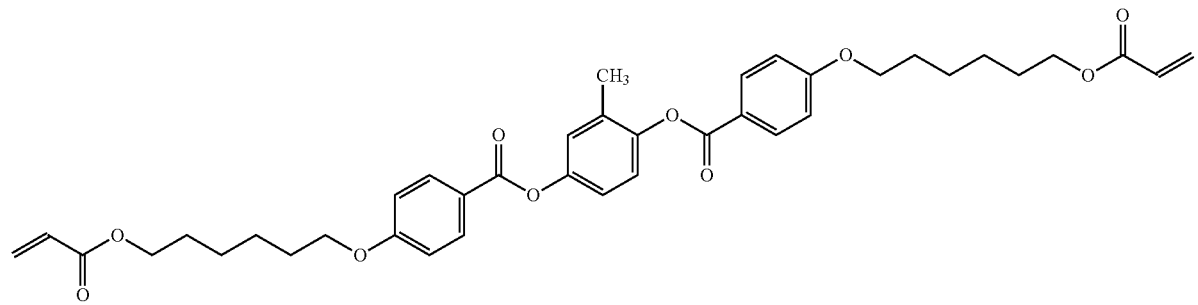

I-19

In another embodiment of the present invention, discotic liquid crystals are employed in the optically anisotropic layer. The optically anisotropic layer is preferably a layer of low-molecular-weight discotic liquid-crystal compounds such as monomers, or a layer of polymers obtained by polymerizing (curing) polymerizable discotic liquid-crystal compounds. Examples of discotic liquid-crystal compounds include the benzene derivatives described in the research report of C. Destrade et al., Mol. Cryst. Vol. 71, p. 111 (1981); the truxene derivatives described in the research report of C. Destrade et al., Mol. Cryst. Vol. 122, p. 141 (1985), Physics Lett, A, Vol. 78, p. 82 (1990); the cyclohexane derivatives described in the research report of B. Kohne et al., Angew. Chem. Vol. 96, p. 70 (1984); and the aza crown and phenyl acetylene macrocycles described in the research report of J. M. Lehn et al., J. Chem. Commun., p. 1,794 (1985) and the research report of J. Zhang et al., J. Am. Chem. Soc., Vol. 116, p. 2,655 (1994), and the disclosures of the above publications are expressly incorporated by reference herein in their entireties. These discotic liquid-crystal compounds generally have a structure with a discotic base nucleus at the center of the molecule, and groups (L), such as linear alkyl groups, alkoxy groups, and substituted benzoyloxy groups, substituted radially. They exhibit liquid crystallinity, and include all compounds generally referred to as discotic liquid crystals. When an aggregate of such molecules is oriented uniformly, it exhibits a negative uniaxial property. However, this description is not a limitation. The compounds described in paragraphs [0061]-[0075] of Japanese Unexamined Patent Publication (KOKAI) No. 2008-281989, the disclosure of which is expressly incorporated by reference herein in its entirety, are examples of discotic liquid-crystal compounds.

When employing a discotic liquid-crystal compound having a reactive group as a liquid-crystal compound, it can be fixed in any of the orientation states of horizontal orientation, vertical orientation, inclined orientation, and twisted orientation.

In the composition containing a liquid-crystal compound that is used to form the optically anisotropic layer by fixation of the orientation of the compounds, a polymerizable monomer can be added to promote crosslinking of the liquid-crystal compound.

A monomer or oligomer undergoing addition polymerization when irradiated with light and having two or more ethylenic unsaturated double bonds can be employed as the polymerizable monomer, for example.

Examples of such monomers and oligomers are compounds having at least one addition polymerizable ethylenic unsaturated group per molecule. Examples are monofunctional acrylates and monofunctional methacrylates such as polyethylene glycol mono(meth)acrylate, polypropylene glycol mono(meth)acrylate, and phenoxyethyl(meth)acrylate; and polyfunctional acrylates and polyfunctional methacrylates such as compounds that have been (meth)acrylated after adding an ethylene oxide or propylene oxide to a polyfunctional alcohol such as trimethylolpropane or glycerin: polyethylene glycol di(meth)acrylate, polypropylene glycol di(meth)acrylate, trimethylol ethane triacrylate, trimethylol propane tri(meth)acrylate, trimethylol propane diacrylate, neopentyl glycol di(meth)acrylate, pentaerythritol tetra (meth)acrylate, pentaerythritol tri(meth)acrylate, dipentaerythritol hexa(meth)acrylate, dipentaerythritol penta(meth)acrylate, hexane dial di(meth)acrylate, trimethylol propane tri(acryloyloxypropyl)ether, tri(acryloyloxyethyl) isocyanurate, tri(acryloyloxyethyl)cyanurate, and glycerin tri (meth)acrylate.

Further examples are the urethane acrylates described in Japanese Examined Patent Publication (KOKOKU) Showa No. 48-41708, Japanese Examined Patent Publication (KOKOKU) Showa No. 50-6034, and Japanese Unexamined Patent Publication (KOKAI) Showa No. 51-37193; the polyester acrylates described in Japanese Unexamined Patent Publication (KOKAI) Showa No. 48-64183, Japanese Examined Patent Publication (KOKOKU) Showa No. 49-43191 and Japanese Examined Patent Publication (KOKOKU) Showa No. 52-30490; and polyfunctional acrylates and methacrylates such as epoxyacrylates that are the reaction products of an epoxy resin with (meth)acrylic acid, and the disclosures of the above publications are expressly incorporated by reference herein in their entireties.

Of these, trimethylol propane tri(meth)acrylate, pentaerythritol tetra(meth)acrylate, dipentaerythritol hexa(meth)acrylate, and dipentaerythritol penta(meth)acrylates are preferred.

An additional suitable example is the "polymerizable compound B" described in Japanese Unexamined Patent Publication (KOKAI) Heisei No. 11-133600, the disclosure of which is expressly incorporated by reference herein in its entirety.

These monomers and oligomers can be employed singly or in mixtures of two or more.

Cationically polymerizable monomers can also be employed. Examples include the epoxy compounds, vinyl ether compounds, oxetane compounds and the like that are given by way of example in Japanese Unexamined Patent Publications (KOKAI) Heisei No. 6-9714, No. 2001-31892, No. 2001-40068, No. 2001-55507, No. 2001-310938, No. 2001-310937, and No. 2001-220526, the disclosures of which are expressly incorporated by reference herein in their entireties.

Examples of epoxy compounds include the aromatic epoxides, alicyclic epoxides, and aliphatic epoxides given below.

Examples of aromatic epoxides include bisphenol A, di- or polyglycidyl ethers of alkyleneoxide adducts thereof, hydrogenated bisphenol A and di- or polyglycidyl ethers of alkylene oxide adducts thereof, and novolac epoxy resins. Examples of alkylene oxides are ethylene oxide and propylene oxide.

Examples of alicyclic epoxides include cyclohexene oxide and cyclopentene oxide-containing compounds obtained by epoxylating a compound having at least one cycloalkane ring such as a cyclohexene or cyclopentene ring with a suitable oxidizing agent such as hydrogen peroxide or peroxide.

Preferred examples of aliphatic epoxides include aliphatic polyalcohols and di- and polyglycidyl ethers of alkylene oxide adducts thereof. Representative examples include: diglycidyl ethers of ethylene glycol, diglycidyl ethers of propylene glycol, diglycidyl ethers of 1,6-hexanediol, and other diglycidyl ethers of alkylene glycols; polyglycidyl ethers of polyalcohols such as di- or tri-glycidyl ethers of glycerin or alkylene oxide adducts thereof; diglycidyl ethers of polyethylene glycols or alkylene oxide adducts thereof; diglycidyl ethers of polypropylene glycol or alkylene oxide adducts thereof; and other diglycidyl ethers of polyalkylene glycols. Examples of the alkylene oxide include ethylene oxide and propylene oxide.

A monofunctional or difunctional oxetane monomer can be employed as a cationically polymerizable monomer in the composition of the present invention. For example, compounds such as 3-ethyl-3-hydroxymethyloxetane (product name OXT101 manufactured by Toagosei Co., Ltd.), 1,4-bis[(3-ethyl-3-oxetanyl)methoxy-methyl]benzene (OXT121, same manufacturer), 3-ethyl-3-(phenoxymethyl)oxetane (OXT211, same manufacturer), di(1-ethyl-3-oxetanyl)methylether (OXT221, same manufacturer), and 3-ethyl-3-(2-ethylhexyloxymethyl)oxetane (OXT212, same manufacturer) are preferably employed. In particular, compounds such as 3-ethyl-3-hydroxymethyloxetane, 3-ethyl-3-(phenoxymethyl)oxetane, and di(1-ethyl-3-oxetanyl)methylether, and all known functional and difunctional oxetane compounds described in Japanese Unexamined Patent Publication (KOKAI) Nos. 2001-220526 and 2001-310937, the disclosures of which are expressly incorporated by reference herein in their entireties, can be employed.

[Two or More Optically Anisotropic Layers]

When two or more optically anisotropic layers each of which is comprised of a composition containing liquid-crystal compounds is laminated, the combination of the liquid-crystal compounds is not specifically limited. Laminates of layers all comprised of rod-like liquid-crystal compounds, laminates of layers comprised of compositions containing discotic liquid-crystal compounds and compositions containing rod-like liquid-crystal compounds, and laminates of layers all comprised of discotic liquid-crystal compounds can all be employed. Nor is the combination of the orientation state of the various layers specifically limited. Laminates of optically anisotropic layers of identical orientation states can be employed, and laminates of optically anisotropic layers of differing orientation states can be employed.

[The Solvent]

An organic solvent is preferably used to prepare a coating liquid, which is used when the composition containing a liquid-crystal compound is applied on the surface of a support or an orientation layer or the like in the form of the coating liquid, described further below. Examples of organic solvents include: amides (such as N,N-dimethylformamide), sulfoxides (such as dimethylsulfoxide), heterocyclic compounds (such as pyridine), hydrocarbons (such as benzene and hexane), alkyl halides (such as chloroform and dichloromethane), esters (such as methyl acetate and butyl acetate), ketones (such as acetone, methyl ethyl ketone, methyl isobutyl ketone, and cyclohexanone), and ethers (such as tetrahydrofuran and 1,2-dimethoxyethane). The alkyl halides and ketones are preferred. Two or more organic solvents can be employed in combination.

[Fixing the Orientation]

The orientation of the liquid-crystal compound is preferably fixed by a crosslinking reaction of reactive groups introduced into the liquid-crystal compound, and more preferably fixed by a polymerization reaction of reactive groups. Polymerization reactions include a thermal polymerization reaction employing a thermal polymerization initiator and a photopolymerization reaction employing a photopolymerization initiator. A photopolymerization reaction is preferred. The photopolymerization reaction can be a radical polymerization or a cation polymerization. Examples of radical polymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynucleic quinone compounds (described in U.S. Pat. Nos. 3,046,127 and 2,951,758), combinations of triarylimidazole dimers and p-aminophenyl ketones (described in U.S. Pat. No. 3,549,367), acrylidine and phenazine compounds (described in Japanese Unexamined Patent Publication (KOKAI) Showa No. 60-105667 and U.S. Pat. No. 4,239,850), and oxadiazole compounds (described in U.S. Pat. No. 4,212,970), and the disclosures of the above patents and publications are expressly incorporated by reference herein in their entireties. Examples of cation photopolymerization initiators include organic sulfonium salts, iodonium salts, and phosphonium salts. The organic sulfonium salts are preferred, and triphenylsulfonium salts are particularly preferred. Hexafluoroantimonate, hexafluorophosphate, and the like are preferably employed as the counter ions of these compounds.

The quantity of photopolymerization initiator employed is preferably 0.01 to 20 weight %, more preferably 0.5 to 5 weight % of the solid component of the coating liquid. Ultraviolet radiation is preferably employed in the light irradiation to polymerize the liquid-crystal compound. The irradiation energy is preferably 10 mJ/cm² to 10 J/cm², more preferably 25 to 800 mJ/cm². The illuminance is preferably 10 to 1,000 mW/cm², more preferably 20 to 500 mW/cm², and still more preferably, 40 to 350 mW/cm². The illumination wavelength preferably has a peak at 250 to 450 nm, and more preferably has a peak at 300 to 410 nm. To promote the photopolymerization reaction, the photoillumination can be conducted in an atmosphere of an inert gas such as nitrogen or under heated conditions.

[Optical Orientation by Irradiation with Polarized Light]

The optically anisotropic layer can be a layer in which in-plane retardation is manifested or increased by optical orientation by irradiation with polarized light. Irradiation with polarized light can be conducted by referring to the description given in paragraphs [0091] and [0092] of Japanese Unexamined Patent Publication (KOKAI) No. 2009-69793, the description given in Published Japanese Translation (TOKUHYO) No. 2005-513241 of a PCT International Application (International Publication WO2003/054111), and the like, the disclosures of which are expressly incorporated by reference herein in their entireties.

[Fixing the Orientation State of a Liquid-Crystal Compound Having a Radically Reactive Group and a Cationically Reactive Group]

As set forth above, the liquid-crystal compound preferably has two or more reactive groups of differing polymerization conditions. In that case, an optically anisotropic layer containing a polymer having an unreacted reactive group can be prepared by polymerizing only a portion of the multiple types of reactive groups through the selection of conditions. Polymerization fixing conditions that are particularly suited to the case where a liquid-crystal compound having a radically reactive group and a cationically reactive group (specific examples of which are 1-8 to 1-15 above) is employed as such a liquid-crystal compound are described below.

First, it is preferable to employ only a photopolymerization initiator acting on the reactive group that is to be polymerized. That is, when selectively polymerizing a radically reactive group, it is preferable to employ only a radical photopolymerization initiator, and when selectively polymerizing a cationically reactive group, it is preferable to employ only a cation photopolymerization initiator. The quantity of photopolymerization initiator that is employed is preferably 0.01 to 20 weight %, more preferably 0.1 to 8 weight %, and still more preferably, 0.5 to 4 weight % of the solid component of the coating liquid.

Next, ultraviolet radiation is preferably used for the irradiation to induce polymerization. In this process, when the irradiation energy and/or illuminance is excessive, there is a risk that both the radically reactive group and the cationically reactive group will end up reacting non-selectively. Accordingly, the irradiation energy is preferably 5 to 500 mJ/cm², more preferably 10 to 400 mJ/cm², and still more preferably, 20 to 200 mJ/cm². The illuminance is preferably 5 to 500 mW/cm², more preferably 10 to 300 mW/cm², and more preferably, 20 to 100 mW/cm². The illumination wavelength preferably has a peak at 250 to 450 nm, and more preferably has a peak at 300 to 410 nm.

Among photopolymerization reactions, reactions employing radical photopolymerization initiators are impeded by oxygen and reactions employing cation photopolymerization initiators are not. Accordingly, when employing a liquid-crystal compound having a radically reactive group and a cationically reactive group and selectively polymerizing one of the reactive groups, it is preferable to conduct the irradiation in an atmosphere of an inert gas such as nitrogen when selectively polymerizing the radically reactive group, and preferable to conduct the irradiation in an atmosphere containing oxygen (such as air) when selectively polymerizing the cationically reactive group. However, reactions using cation photopolymerization initiators are impeded by moisture. The humidity of the atmosphere of the polymerization reaction is thus preferably low. Specifically, 60% or lower is preferred, and 40% or lower is more preferred. In addition, reactions using cation photopolymerization initiators tend to have higher reactivity at higher temperatures. Therefore, the reaction temperature is preferably high as possible in the range in which the liquid-crystal compound shows liquid crystallinity.

Further, when a liquid-crystal compound having a radically reactive group and a cationically reactive group are employed and one of the reactive groups is selectively polymerized, a polymerization inhibitor on the other reactive group can be preferably employed as a means of selective polymerization of the former. For example, when a liquid-crystal compound having a radically reactive group and a cationically reactive group is emplyed and the cationically reactive group is selectively polymerized, a small quantity of radical polymerization inhibitor can be added to enhance the selectivity. The quantity of such a polymerization inhibitor that is added is preferably 0.001 to 10 weight %, more preferably 0.005 to 5 weight %, and still more preferably, 0.02 to 1 weight % of the solid component of the coating liquid. Examples of radical polymerization inhibitors are nitrobenzene, phenothiazine, and hydroquinone. The hindered phenols that are commonly employed as oxidation inhibitors are also effective as radical polymerization inhibitors.

[Horizontal Orientation Agents]

Incorporating at least one from among the compounds represented by general formulas (1) to (3) and fluorine-containing homopolymers and copolymers employing the monomer of general formula (4) described in paragraphs [0098] to [0105] in Japanese Unexamined Patent Publication (KOKAI) No. 2009-69793, the disclosure of which is expressly incorporated by reference herein in its entirety, into the composition for forming the above optically anisotropic layer essentially horizontally orients the molecules of the liquid-crystal compound. In the present description, the term "horizontal orientation" refers, in the case of rod-like liquid crystals, to the major axis of the molecule being parallel to the horizontal surface of the support, and refers, in the case of discotic liquid crystals, to the disc surface of the core of the discotic liquid crystal compound being parallel to the horizontal surface of the support. However, it is not required that they be strictly parallel; in the present description, this refers to an orientation with an angle of incline relative to the horizontal surface of less than 10 degrees, preferably to an angle of incline of 0 to 5 degrees, more preferably to an angle of incline of 0 to 3 degrees, still more preferably to an angle of incline of 0 to 2 degrees, and optimally, to an angle of incline of 0 to 1 degree.

The quantity of the horizontal orientation agent is preferably 0.01 to 20 weight %, more preferably 0.01 to 10 weight %, and still more preferably, 0.02 to 1 weight % of the weight of the liquid-crystal compound. The compounds represented by general formulas (1) to (4) described in paragraphs [0098] to [0105] in Japanese Unexamined Patent Publication (KOKAI) No. 2009-69793 can be employed singly or in combinations of two or more.

[Two or More Optically Anisotropic Layers]

As described above, birefringence pattern builders can contain two or more optically anisotropic layers. The two or more optically anisotropic layers can be adjacent in the normal direction, or a functional layer can be sandwiched between them. The retardation of the two or more optically anisotropic layers can be approximately equivalent, or can be different. The slow axes can be approximately identically oriented, or can be oriented in different directions. By using two or more optically anisotropic layers the slow axes of which are oriented in approximately identical directions, a pattern with a high degree of retardation can be prepared.

A birefringence pattern builder having two or more optically anisotropic layers can be prepared, for example, by the methods of directly forming an optically anisotropic layer on a birefringence pattern builder, and by employing a separate birefringence pattern builder as a transfer material to transfer an optically anisotropic layer onto a birefringence pattern builder. Of these methods, the method of employing a separate birefringence pattern builder as a transfer material to transfer an optically anisotropic layer onto a birefringence pattern builder is preferred.

[After-Treatment of the Optically Anisotropic Layer]

Various after-treatments can be used to modify the optically anisotropic layer that has been prepared. Examples of after-treatments include corona treatment to enhance adhesion, the addition of plasticizers to enhance flexibility, the addition of thermal polymerization inhibitors to enhance storage properties, and coupling processing to enhance reactivity. When the polymer in the optically anisotropic layer has an unreacted reactive group, the addition of a polymerization initiator corresponding to the reactive group is an effective means of modification. For example, by the addition of a radical photopolymerization initiator to an optically anisotropic layer in which the orientation of a liquid-crystal compound containing cationically reactive groups and radically reactive groups has been fixed with a cation photopolymerization initiator, the reaction of the unreacted radically reactive group can be promoted when patterned light exposure is subsequently conducted. Examples of means of adding plasticizers and photopolymerization initiators include immersing the optically anisotropic layer in a solution of the corresponding additive, and applying a solution of the corresponding additive on the optically anisotropic layer to permeate it. A method using an additive layer can also be employed, in which, when applying another layer on the optically anisotropic layer, the additive is first added to a coating liquid of the other layer, and then the additive is caused to permeate the optically anisotropic layer. In this process, it is possible to adjust the relation between the level of exposure of individual regions during patterned light exposure of the birefringence pattern builder, described further below, and the final retardation of the various regions that is achieved, and approximate desired material properties based on the additive that is used in the permeation, particularly the type and quantity of photopolymerization initiator.

[Additive Layer]

The additive layer that is formed on the optically anisotropic layer can also functions as a photosensitive resin layer such as a photoresist, a scattering layer that controls reflective gloss, a hardcoat layer that prevents scratching of the surface, a water-repellent and oil-repellent layer that prevents the sticking of fingerprints and doodling with markers and the like, an antistatic layer that prevents the adhesion of debris due to charge buildup, or a print coating layer for providing print on the surface. At least one polymer and at least one photopolymerization initiator are preferably contained in a photosensitive resin layer. The additive layer preferably contains at least one polymerization initiator that functions to initiate a polymerization reaction by the unreacted reactive group in the optically anisotropic layer. In this case, it is preferable that the optically anisotropic layer and the additive layer containing a polymerization initiator are adjacent to each other. With such a structure, a birefringence pattern builder with which a birefringence pattern can be formed by a patterned radiation of heat or light without addition of an extra photopolymerization initiator can be made. The components of the additive layer containing a photopolymerization initiator is not particularly limited but is preferred to contain at least one polymer other than the photopolymerization initiator.

The polymer (which may be referred simply to as "binder", hereinafter) is not particularly limited and the examples include poly methyl(meth)acrylate, a copolymer of (meth) acrylic acid and its various esters, polystyrene, copolymer of styrene and (meth)acrylic acid or various kinds of (meth) acrylic esters, polyvinyl toluene, copolymer of vinyltoluene and (meth) acrylic acid or various kinds of (meth) acrylic esters, styrene/vinyltoluene copolymer, polyvinyl chloride, a polyvinylidene chloride, polyvinyl acetate, vinyl acetate/ethylene copolymer, vinyl acetate/vinyl chloride copolymer, polyester, polyimide, carboxymethyl cellulose, polyethylene, polypropylene, polycarbonate, and the like. Particularly preferable examples include a copolymer of methyl(meth)acrylate and (meth)acrylic acid, a copolymer of allyl (meth)acrylate and (meth)acrylic acid, and multi-system copolymer of benzyl (meth)acrylate and (meth)acrylic acid and other monomer. These polymers may be used independently or in combinations of plural types. The content of the polymer generally falls in the range from 20 to 99% by weight, preferably from 40 to 99% by weight, and more preferably from 60 to 98% by weight with respect to the total weight of the solid components contained in the polymer composition.

The photopolymerization initiator may be a thermal polymerization initiator or a photopolymerization initiator, either of which can be used depending on the purpose. The photopolymerization initiator may be a radical photopolymerization initiator, or a cation photopolymerization initiator. The radical photopolymerization initiator used for the photosensitive polymer layer can be exemplified by vicinal polyketaldonyl compounds disclosed in U.S. Pat. No. 2,367,660, acyloin ether compounds described in U.S. Pat. No. 2,448,828, aromatic acyloin compounds substituted by α-hydrocarbon described in U.S. Pat. No. 2,722,512, polynuclear quinone compounds described in U.S. Pat. Nos. 3,046,127 and 2,951,758, combination of triaryl imidazole dimer and p-aminoketone described in U.S. Pat. No. 3,549,367, benzothiazole compounds and trihalomethyl-s-triazine compounds described in Examined Japanese Patent Publication "Tokkosho" No. 51-48516, trihalomethyl-triazine compounds described in U.S. Pat. No. 4,239,850, and trihalomethyl oxadiazole compounds described in U.S. Pat. No. 4,212,976. Trihalomethyl-s-triazine, trihalomethyl oxadiazole and triaryl imidazole dimer are particularly preferable. Besides these, "polymerization initiator C" described in Japanese Laid-Open Patent Publication "Tokkaihei" No. 11-133600 can also be exemplified as a preferable example. The disclosures of the above publications in this paragraph are expressly incorporated by reference herein in their entireties.

The cation photopolymerization initiator can be exemplified by organic sulfonium salts, iodonium salts, and phosphonium salts. An organic sulfonium salt is preferable and triphenyl sulfonium salt is more preferable. As a counter ion of these compounds, hexafluoro antimonate, hexafluoro phosphate, or the like is preferably used.

The amount of the photo-polymerization initiators to be used is preferably 0.01 to 20% by weight, more preferably 0.2 to 10% by weight on the basis of solids in the additive layer.

[Additive Layer Having Light Scattering Property]

By applying light scattering property to the additive layer, it becomes possible to control glare of the product or covert property (confidentiality, a property enabling a latent image far less visible or invisible under a light source without polarization property). As a scattering layer, a layer having convexo-concave on the surface with embossing treatment, or a matting layer containing a matting agent such as particles is preferred. As particles that improve the covert property, the particle size is preferably 0.01 to 50 micrometers, more preferably 0.05 to 30 micrometers. The concentration of the particle is preferably 0.01 to 5% and more preferably 0.02 to 1%.

[Additive Layer Having Hard Coating Property]

In order to apply hard coating property, it is preferred to use polymer with high Tg as a polymer in the additive layer. Tg is preferably 50° C. or more, more preferably 80° C. or more, and further preferably 100° C. or more. To increase Tg of the polymer, a polar group such as hydroxyl group, carboxylic acid group, or amino group can be introduced. Examples of polymers having high Tg include reaction products of an alkyl(meth)acrylate such as poly methyl(meth)acrylate or poly ethyl(meth)acrylate, a copolymer of an alkyl(meth)acrylate and (meth) acrylic acid, reaction products of a hydroxyl group containing (meth)acrylate such as 2-hydroxylethyl (meth)acrylate or 2-hydroxylpropyl(meth)acrylate, and copolymer of an alky(meth)acrylate and a half ester produced from a reaction of a hydroxyl group containing (meth)acrylate and acid anhydride such as succinic acid anhydride and phthalic acid anhydride.

In addition, in order to apply hard coating property, a layer formed by polymerizing a layer containing at least one polymerizable monomer and polymerizable polymer having two or more functional groups by irradiation of light or heat. Examples of the reactive group include vinyl group, allyl group, (meth) acrylic group, epoxy group, oxetanyl group, or vinyl ether group. Examples of polymerizable polymer include glycidyl(meth)acrylate, an allyl(meth)acrylate, an ethyleneglycol di-(meth)acrylate, a reaction product of a polymerizable group containing acrylate such as glycerol 1,3-di(meth)acrylate, copolymer of polymerizable group containing acrylate and reaction product (meth) acrylic acid, and its multi-system copolymer with other monomers.

[Additive Layer as Print Coating Layer]

It is preferable that print ink can be applied on the additive layer to form a pattern that can be recognized by visible light, ultraviolet light, or infrared light. It is also preferable to introduce a polar group such as carboxylic acid group or hydroxy group to the side chain of the polymer in the aim of the improvement of the wettability of the ink.

As measures to improve the wettability, surface-modifying treatment can be conducted at the same time. Examples of the surface-modifying treatment include UV treatment such as those using a low pressure mercury lamp or excimer lamp, and discharge treatment such as corona discharge or glow discharge. Among UV treatments, the treatment using excimer, which has higher energy and high modification efficiency, is preferred.

As ink for the printing, UV fluorescent ink and IR ink are themselves forms of security printing, and are thus preferable to enhance security. The method for printing is not specifically limited. Generally known flexo printing, gravure printing, offset printing, screen printing, ink-jet printing, xerography, and the like can be employed. Microprinting at a resolution of 1,200 dpi or higher is preferable to increase security.

[The Support]

The birefringence pattern builder has a support to ensure dynamic stability. The support in the birefringence pattern builder will serve as a support in the patterned birefringent product. In the present invention, it is characteristic that the support in the birefringence pattern builder has a laminate film on its surface opposite to the surface to which the optically anisotropic layer is provided.

The support is not specifically limited. Examples include plastic films such as cellulose esters (such as cellulose acetate, cellulose propionate, and cellulose butyrate), polyolefins (such as norbornene polymers), poly(meth)acrylic acid esters (such as polymethyl methacrylate), polycarbonates, polyesters, polysulfones, norbornene polymers, polyimide polymers, paper, aluminum foil, and cloth. Due to ease of handling, the thickness of the flexible support is preferably 3 to 500 micrometers, and more preferably, 10 to 200 micrometers. As the support of the birefringence pattern builder of the present invention has a laminate film, the thickness of the support is not needed to be increased in the aim of maintaining a dynamic stability during the production process and thus may be 10 to 100 micrometers, preferably 10 to 50 micrometers. The support preferably has heat resistance adequate to prevent deformation and coloration during baking, described further below. Instead of the reflective layer described further below, it may also be preferable for the support to have a reflective function.

[The Laminate Film Bonded to the Support]

The laminate film is formed of a laminate substrate and an adhesive layer. As the laminate film, a commercially available laminate film may be used, or a laminate substrate prepared separately may be used by applying an adhesive agent.

The surface of the laminate film opposite to the surface bonded to the support preferably is mat. In such a manner, the two sides of the birefringence pattern builders become resistant to adhere. Specifically, "the maximum height Rt of the roughness curve" (which may be also referred to "Roughness of the back surface" in the Examples) that is the difference between the highest point and the lowest point of the surface is preferably 1.0 micrometer. Rt may be 1.0 to 100 micrometers, preferably more than 1.2 micrometers and 20 micrometers or lower. When thickness of the adhesive layer that is described later is 1 micrometer or lower, Rt is preferably 2.0 micrometers or more. Rt is determined by the method as described in [Measurement and evaluation method, (1) Measurement of the roughness of the back surface]. To make the surface of the laminate film mat, a mat layer containing microparticle can be provided, or sand mat processing or an embossment can be conducted.

The laminate substrate is not specifically limited. Examples include plastic films such as cellulose esters (such as cellulose acetate, cellulose propionate, and cellulose butyrate), polyolefins (such as norbornene polymers), poly(meth)acrylic acid esters (such as polymethyl methacrylate), polycarbonates, polyesters, polysulfones, norbornene polymers, polyimide polymers, paper, aluminum foil, and cloth. From the viewpoint of handling and cost, cellulose esters and polyesters are preferred, and polyester is more preferred. Among the polyester, PEN and PET are most preferred.

The film thickness is preferably set such that the sum of the film thickness of the support and the laminate film is preferably 3 to 500 micrometers, more preferably 10 to 200 micrometers, further preferably 20 to 100 micrometers.

The laminate substrate does not constitute the patterned birefringent product and removed in the production process. Therefore, the performance required as its transparency and refraction property is not particularly limited, and a material that is inexpensive as possible can be used from the viewpoint of the cost.

As the adhesive layer, an adhesive layer that has adhesivity to bind to the laminate substrate and the support, but can be easily delaminated from the support after the adhesion is used. It is preferred that the delamination from the support can be achieved without leaving any marks on the support after the delamination. In addition, it is preferred that such properties do not change in the process of the preparation of the birefringence pattern that will be described below.

Alternatively, the adhesive layer may adhere to the laminate substrate and the support and cannot be delaminated from either of the layer after the adhesion but become easily delaminated from the support in the process of the preparation of the birefringence pattern that will be described below. The adhesive layer is not specifically limited and adhesive agents in which tackifier, softener, cross-linking agent, filler, antistaling agent, or the like is added to elastic material, acrylic material, silicon material, urethane material, or the like can be used. The thickness of the adhesive layer is preferably 0.1 to 100 micrometers, more preferably 1 to 30 micrometers, further preferably 2 to 10 micrometers, The laminate film is not specifically limited and a film in which the above adhesive layer is provided on the above laminate substrate, or the like can be used. Alternatively, a film in which a laminate substrate, an adhesive layer, and a separator is stacked in this order is prepared, and the separator can be removed for the actual use just before binding the adhesive layer of the laminate film to the support, and the remaining stack can be used.

The laminate film is preferably bonded to the support before the formation of the optically anisotropic layer. In addition, when an orientation layer that will be described below is used for the formation of the optically anisotropic layer, the laminate film is preferably bonded to the support before the formation of the orientation layer.

Delamination of the laminate film can be conducted before or after the heating (baking) step described later or can skipped to proceed to obtain a patterned birefringent product. However, when the temperature in the heating (baking) step is higher than the glass-transition temperature of the laminate substrate, the delamination is preferably conducted before the heating (baking) step.

[The Orientation Layer]

As set forth above, an orientation layer can be employed in the formation of the optically anisotropic layer. The orientation layer is generally provided on the support or temporary support, or on an undercoating layer that is applied on the support or temporary support. The orientation layer functions to determine the orientation of the liquid-crystal compound provided on it. The orientation layer can be any layer that imparts an orientation to the optically anisotropic layer. Preferred examples of the orientation layer include rubbed layers of organic compounds (preferably polymers); optical orientation layers that exhibit a liquid-crystal orienting property by irradiation with polarized light, such as azobenzene polymers and polyvinyl cinnamate; oblique vapor-deposition layers of inorganic compounds; microgrooved layers; cumulative films of omega-tricosanoic acid, dioctadecyl methyl ammonium chloride, methyl stearate or the like formed by the Langmuir-Blodgett method (LB method); and films in which a dielectric is oriented by imparting an electric or magnetic field. In the rubbed form of orientation films, polyvinyl alcohol is preferably contained, and the ability to crosslink with at least one layer either above or below the orientation layer is particularly preferred. An optical orientation layer and microgrooves are preferred as methods of controlling the direction of orientation. Compounds that exhibit orientation based on dimers, such as polyvinyl cinnamate, are particularly preferred as optical orientation layers. Embossing with a master roll manufactured in advance by mechanical or laser processing is particularly preferable for microgrooves.

[Reflective Layer]

Birefringence pattern builder may have a reflective layer for the fabrication of birefringence pattern that is more easily recognized. The reflective layer is not specifically limited, but preferably does not have a depolarization property. Examples include metal layers such as aluminum and silver, a reflective layer of multilayered films of dielectrics, and printed layers with gloss. A semi-transmissive-half-reflective layer of transmittance of preferably 20 to 70%, and more preferably 30 to 60% may also be used when transparency is needed. A semi-transmissive-half-reflective layer can be preferably manufactured by the method of reducing the thickness of the metal layer, which is inexpensive. A semi-transmissive-half-reflective layer of metal absorbs light. Thus, a dielectric multilayer film that permits control of transmission and reflection without absorption is preferred from the perspective of light-use efficiency. The reflective layer can be formed on a product after birefringence pattern formation.

[The Adhesive Layer]

The birefringence pattern builder can have an adhesive layer for adhering the patterned birefringent product that has been prepared to other products after the patterned light exposure and baking described further below. The material of the adhesive layer is not specifically limited, but a material that retains adhesiveness even after the baking step in the production of a birefringence pattern is preferred. The adhesive layer can be formed on the product after formation of the birefringence pattern.

[The Coating Method]

Various layers such as the optically anisotropic layer and the orientation layer can be formed by application of a coating solution by the dip coating method, air knife coating method, spin coating method, slit coating method, curtain coating method, roller coating method, wire bar coating method, gravure coating method, and extrusion coating method (U.S. Pat. No. 2,681,294, the disclosure of which is expressly incorporated by reference herein in its entirety). Two or more layers can be simultaneously applied. Simultaneous application methods are described in U.S. Pat. Nos. 2,761,791, 2,941,898, 3,508,947, and 3,526,528, and in Yuji Harazaki, Coating Technology, p. 253, Asakura Shoten (1973), the disclosures of which are expressly incorporated by reference herein in their entireties.

[Preparation of a Patterned Birefringent Product]

A patterned birefringent product can be prepared by at least sequentially patterned light exposing and heating (baking) a birefringence pattern builder.

[Patterned Light Exposure]

In the present description, the term "patterned light exposure" means exposure conducted in a manner that some of the regions of a birefringence pattern builder are exposed to light or exposure conducted under different exposure conditions in two or more regions. In exposures conducted under different exposure conditions to each other, no exposure (unexposed regions) may be included. The patterned light exposure technique employed can be contact exposure with a mask, proximity exposure, projection exposure, or the like. Scanning exposure in which a laser, electron beam, or the like is focused on a determined position, without employing a mask, to directly draw an image can also be employed. When the form of the birefringence pattern builder is sheet-like, batch-type light exposure can be employed and when the form of the birefringence pattern builder is roll-like, Roll to Roll light exposure can be employed. The illumination wavelength of the light source used in exposure preferably has a peak at 250 to 450 nm, and more preferably, has a peak at 300 to 410 nm. Specific examples include ultra-high-pressure mercury lamps, high-pressure mercury lamps, metal halide lamps, and blue lasers. The preferred exposure level is normally about 3 to 2,000 mJ/cm$^2$, more preferably about 5 to 1,000 mJ/cm$^2$, and optimally, about 10 to 500 mJ/cm$^2$. The resolution in patterned light exposure is preferably 1,200 dpi or higher to permit the formation of a microprint latent image. To increase the resolution, it is preferable and necessary for the patterned optically anisotropic layer to be solid during patterned light exposure, and for the thickness to be 10 micrometers or less. To achieve a thickness of 10 micrometers or less, the patterned optically anisotropic layer is preferably formed of a layer containing a polymerizable liquid-crystal compound the orientation of which has been fixed. More preferably, the polymerizable liquid-crystal compound contains two or more types of reactive groups with different crosslinking mechanisms. The center core employed in the Roll to Roll light exposure is not particularly limited, the outer diameter of the center core is preferably about 10 to 3000 mm, more preferably about 20 to 2000 mm and further preferably about 30 to 1000 mm. Tension at the rolling to the center core is not particularly limited and is preferably about 1N to 2000N, more preferably about 3N to 1500N and further preferably about 5N to 1000N.

[The Exposure Conditions During Patterned Light Exposure]

In the course of conducting the exposure of two or more regions of the birefringence pattern builder under mutually different exposure conditions, the "two or more regions" may or may not have overlapping portions. However, the regions preferably do not have overlapping portions. Patterned light exposure can be conducted in multiple exposure cycles; can be conducted for example in a single exposure cycle using a mask or the like having two or more regions exhibiting different transmission spectra based on the region; or the two can be combined. That is, during patterned light exposure, exposure can be conducted such that two or more regions that have been exposed under different exposure conditions are produced. The scanning exposure is preferable because, in the scanning exposure, the exposure conditions can be varied for each region by the techniques of varying the light source intensity by exposure region, changing the illumination spots of the exposure regions, changing the scan rate, and the like.

The exposure conditions are not specifically limited. Examples include the peak exposure wavelength, the exposure illuminance, the exposure time, the exposure level, the temperature during exposure, and the atmosphere during exposure. Of these, from the perspective of the ease of adjusting exposure conditions, the peak exposure wavelength, the exposure illuminance, the exposure time, and the exposure level are preferred, and the exposure illuminance, exposure time, and exposure level are more preferred. The regions that are exposed under mutually different exposure conditions during patterned light exposure are subsequently subjected to a baking step and exhibit mutually different birefringence that is controlled based on the exposure conditions. In particular, different retardation values are imparted to the regions. That is, by adjusting the exposure conditions for each region during patterned light exposure, a birefringence pattern of desired retardation that differs by region can be obtained after the baking step. The exposure conditions can be varied continuously or discontinuously between two or more exposure regions being exposed under different exposure conditions.

[Mask Exposure]

Exposure employing an exposure mask is useful as a means of producing exposure regions under different exposure conditions. For example, exposure can be conducted with an exposure mask so that only one region is exposed. Then exposure with a separate mask or total surface exposure can be conducted with the temperature, atmosphere, exposure illuminance, exposure time, and exposure wavelength changed. In this manner, exposure conditions of the region exposed first and the regions subsequently exposed can be readily changed. Masks having two or more regions exhibiting different transmission spectra to each other are particularly useful as masks for changing the exposure illuminance or exposure wavelength. In that case, different exposure illuminances and exposure wavelengths in multiple regions can be achieved in a single exposure cycle. Different exposure levels can also be imparted with an identical period of exposure under different exposure illuminances.

[Scanning Exposure]

Scanning exposure can be conducted by applying an image drawing device to form a desired two-dimensional pattern on a drawing surface with light, for example.

One representative example of such a drawing device is an image recording device that is configured to use a laser beam deflection scanning means to scan an object that is being scanned with a laser beam directed from a laser beam generating means to record a prescribed image or the like. This type of image recording device modulates the laser beam being directed from the laser beam generating means based on an image signal during the recording of the image or the like (Japanese Unexamined Patent Publication (KOKAI) Heisei No. 7-52453, the disclosure of which is expressly incorporated by reference herein in its entirety).

A device in which recording is conducted by scanning a laser beam in a secondary scan direction on an object being scanned that has been adhered on the outer circumference surface of a drum rotating in a primary scan direction, and a device in which recording is conducted by rotationally scanning a laser beam over an object being scanned that has been adhered to the cylindrical inner circumference surface of a drum can be employed (Japanese Patent No. 2,783,481, the disclosure of which is expressly incorporated by reference herein in its entirety).

A drawing device forming a two-dimensional pattern on a drawing surface with a drawing head can also be employed. For example, an exposure device forming a desired two-dimensional pattern on the exposure surface of a photosensitive material or the like with an exposure head, which is employed to fabricate semiconductor substrates and print plates, can be employed. A typical example of such an exposure head is equipped with a pixel array with multiple pixels that generates a group of light points constituting a desired two-dimensional pattern. By operating this exposure head while displacing it relative to an exposure surface, a desired two-dimensional pattern can be formed on the exposure surface.

As an exposure device such as those set forth above, for example, an optical device has been proposed that forms a desired image on an exposure surface by displacing a digital micromirror device (DMD) in a prescribed scan direction on an exposure surface, inputting frame data comprised of multiple drawing point data corresponding to the multiple micromirrors into the memory cells of the DMD based on the displacement in the scan direction, and sequentially forming a group of drawing points corresponding to the micromirrors of the DMD in a time series (Japanese Unexamined Patent Publication (KOKAI) No. 2006-327084, the disclosure of which is expressly incorporated by reference herein in its entirety).

In addition to the above DMD, a transmitting-type spatial light-modulating element can be employed as the spatial light-modulating element provided on an exposure head. The spatial light-modulating element can be of either the reflecting type or transmitting type. Additional examples of spatial light-modulating elements include the micro-electrical mechanical system (MEMS) type of spatial light-modulating element (special light modulator (SLM)), optical elements that modulate transmitted light by means of an electro-optical effect (PLZT elements), liquid-crystal light shutters (FLC), and other liquid-crystal shutter arrays. The term "MEMS" is a general term for microsystems integrating microscopic sensors, actuators, and control circuits by means of micromachining technology based on IC manufacturing processes. The term "MEMS-type spatial light-modulating element" means a spatial light-modulating element that is driven by electromechanical operation utilizing electrostatic forces.

A device in which multiple grating light valves (GLVs) are disposed in a two-dimensional configuration can also be employed.

In addition to the above laser beam source, lamps and the like can be employed as the light sources of the exposure head.

[Patterned Light Exposure of Two or More Optically Anisotropic Layers]

A new transfer material for building birefringence patterns can also be transferred onto a laminate obtained by patterned light exposure on a birefringence pattern builder, and then patterned light exposure can be conducted again. In that case, the retardation values remaining following baking in a region that remains unexposed both the first and second times (which normally have the lowest retardation values), a region that is exposed the first time but is not exposed the second time, and a region that is exposed both the first and second times (which normally have the highest retardation values) can be effectively changed. Regions that are not exposed the first time but are exposed the second time can be thought of as being identical after the second exposure to regions that have been exposed both the first and second times. Similarly, by alternately conducting transfer and patterned light exposure three or four times, four or more regions can be readily prepared. This method is useful when it is desirable to impart differences (differences in optical axis direction, extremely large differences in retardation, and the like) to different regions that cannot be imparted by means of exposure conditions alone.

[Heating (Baking)]

A birefringence pattern can be prepared by heating a birefringence pattern builder that has been subjected to the patterned light exposure at 50° C. or higher but not higher than 400° C., preferably at 80° C. or higher but not higher than 400° C. As a heating unit, hot-air furnace, muffle furnace, IR heater, ceramic heater, electric furnace, or the like can be employed. When the form of the birefringence pattern builder is sheet-like, batch-type heating can be employed and when the form of the birefringence pattern builder is roll-like, roll-to-roll-type heating can be employed. The center core employed in the roll-to-roll-type heating is not particularly limited, the outer diameter of the center core is preferably about 10 to 3000 mm, more preferably about 20 to 2000 mm and further preferably about 30 to 1000 mm. Tension at the rolling to the center core is not particularly limited and is preferably about 1N to 2000N, more preferably about 3N to 1500N and further preferably about 5N to 1000N.

The birefringence pattern can contain a region in which the retardation is essentially 0. For example, when an optically anisotropic layer is formed employing a liquid-crystal compound having two or more reactive groups, portions that remain unexposed following patterned light exposure lose their retardation during baking, resulting in a retardation of essentially 0.

Also, a new transfer material for building a birefringence pattern can be transferred onto a birefringence pattern builder that has been baked, after which patterned light exposure and baking can be conducted anew. In that case, combining the first and second exposure conditions, the retardation value remaining after the second baking can be effectively changed. This method is useful when it is desirable to form two regions with birefringence properties that mutually differ in the directions of the slow axes in shapes that do not overlap.

[Thermal Writing]

As set forth above, a retardation of essentially 0 can be achieved by baking unexposed regions. Thus, in addition to a latent image based on patterned light exposure, a latent image based on thermal writing can be included in a patterned birefringent product. Thermal writing can be conducted with a thermal head, or by drawing with an IR or YAG laser or the like. For example, information that must be kept secret (personal information, passwords, management codes of products that could compromise designs, and the like) can be conveniently rendered as latent images in combination with a small printer having a thermal head. Thermal writing IR and YAG lasers that are usually used for corrugated fiberboard containers can be used without any modification.

[Functional Layers Laminated on Birefringence Patterns]

After exposing and baking the birefringence pattern builder to form a birefringence pattern as set forth above, functional layers with various functions can be laminated to obtain a patterned birefringent product. The functional layers are not specifically limited and examples includes a surface layer and a printed layer.

[Surface Layers]

Examples of surface layers include a scattering layer that controls the reflection gloss, a hardcoat layer that prevents scratching of the surface, a water-repellent and oil-repellent layer that prevents the sticking of fingerprints and doodling with magic markers, and an antistatic layer that prevents the adhesion of debris due to charge buildup. The scattering layer is preferably a surface irregularity layer formed by embossing or a matte layer that contains matting agents such as particles. The hardcoat layer is preferably a layer containing at least one bifunctional or higher polymerizable monomer, that have been polymerized by irradiation with light or by heating. The surface layer can also be provided on the birefringence pattern builder before pattern formation. The surface layer can be provided in advance on the birefringence pattern builder as an additive layer, for example.

[Protective Layers]

Particularly in an embodiment in which a semi-transmissive-half-reflective layer is employed, nonuniformity due to optical interference sometimes appears. A protective layer having refractive index 1.4 to 1.7, thickness of 30 micrometers or more, preferably 50 micrometers or more, more preferably 100 micrometers or more can be bonded to the product in a state of optical contact. In this manner, the difference with the optically anisotropic layer in the refractive index becomes small, and nonuniformity can be reduced. A refractive indexmatching oil, adhesive, or contact adhesive can be employed to achieve optical contact. For convenience, adhesive or contact adhesive is preferred.

[Printed Layer]

The patterned birefringent product has a printed layer. Examples of print layers include layers in which patterns that are recognizable with visible light, UV radiation, IR radiation, or the like have been formed. UV fluorescent ink and IR ink are themselves forms of security printing, and are thus preferable to enhance security. The method used to form a printed layer is not specifically limited. Generally known flexo printing, gravure printing, offset printing, screen printing, ink-jet printing, xerography, and the like can be employed. Various types of ink can be employed as the ink. From the viewpoint of durability, UV ink is preferably used. Microprinting at a resolution of 1,200 dpi or higher is preferable to increase security.

[Applications of Patterned Birefringent Products]

Products that are obtained by exposing and baking birefringence pattern builders as set forth above are normally either nearly colorless or transparent, or permit only the identification of an image based on a print layer or the like. However, when such products are sandwiched between two polarizing plates, or, are viewed through a polarizing plate when the device has a reflective layer or a semi-transmissive-half-reflective layer, an additional characteristic contrast or colors are exhibited and can be readily visibly recognized. Utilizing this property, patterned birefringent products obtained by the above manufacturing method can be employed as means of preventing forgery, for example. That is, using a polarizing plate, images with multiple colors that are normally nearly invisible to the naked eye can be made out in the patterned birefringent product. When a birefringence pattern is copied without the intervention of a polarizing plate, nothing is picked up. Conversely, when copied through a polarizing plate, a permanent pattern, that is, a pattern that is visible even without the polarizing plate, remains. Accordingly, it is difficult to duplicate a birefringence pattern. Such methods of producing birefringence patterns are not widespread and the materials are also quite unique. Thus, such products are thought to be suited to use as means of preventing counterfeiting.

In particular, a patterned birefringent product containing a semi-transmissive-half-reflective layer can be bonded with an adhesive or the like onto text, photographs, and the like printed on paper. Further, a patterned birefringent product employing a semi-transmissive-half-reflective layer can be bonded onto a common product having an adhesive function, such as a laminate film and a transparent label.

The patterned birefringent product does not only have security functions based on latent images. When coded with bar codes, QR codes, or the like, they can carry digital information. Digital encryption is also possible. As set forth above, by forming high-resolution latent images, a micro latent image that cannot be made out with the naked eye even through a polarizing plate can be printed, thereby further enhancing security. Additionally, security can be enhanced by combining such a device with the printing of invisible ink, such as UV fluorescent ink or IR ink. Such a device can also be combined with the function of label preventing malicious opening of a product, such that when the label is removed, a portion of the adhesive remains on the target item in the form of a pattern.

Patterned birefringent products can be compounded with functions other than security functions. They can be combined with product information display label functions such as price tags and 'Best used by' dates, water immersion label functions achieved by the printing of ink that changes color when exposed to water, security insurance certificates, and voting forms.

When an adhesive layer is provided on a patterned birefringent product for use as a label, there is a risk of the label being removed from the target item and re-used, thereby compromising security. Thus, the label is preferably processed to render it brittle and prevent its re-use. The method of embrittlement processing is not specifically limited. Examples include methods of embrittling the support itself and cutting notches into the label.

[Optical Elements]

Patterned birefringent products obtained by the above manufacturing method can also be used on optical elements. For example, when a patterned birefringent product obtained by the above manufacturing method is employed as a structural optical element, a special optical element that produces its effect only under prescribed polarization can be fabricated. As an example, a diffraction grating with a birefringence pattern can function as a polarization separating element that strongly diffracts specified polarized light, permitting application to projectors and the field of optical communications.

EXAMPLES

The present invention is described in greater detail below through examples. The materials, reagents, material quantities, and their ratios, operations, and the like indicated in the examples below can be suitably modified without departing from the scope or spirit of the present invention. Accordingly, the scope of the present invention is not limited to the specific examples given below.

(Preparation of Orientation Layer Coating Liquid AL-1)

The following composition was prepared, passed through a polypropylene filter with a pore size of 30 micrometers, and employed as orientation layer coating liquid AL-1.

| Orientation layer Al-1 coating liquid composition (weight %) | |
|---|---|
| Polyvinyl alcohol (PVA205, manufactured by Kuraray) | 3.21 |
| Polyvinyl pyrrolidone (Luvitec K30, manufactured by BASF) | 1.48 |
| Distilled water | 52.10 |
| Methanol | 43.21 |

(Preparation of Optically Anisotropic Layer Coating Liquid LC-1)

The following composition was prepared, passed through a polypropylene filter with a pore size of 0.2 micrometers, and employed as optically anisotropic layer coating liquid LC-1.

LC-1-1 was a liquid-crystal compound with two reactive groups. One of the two reactive groups was a radically reactive group in the form of an acrylic group, and the other was a cationically reactive group in the form of an oxetane group.

| Optically anisotropic layer coating liquid composition (weight %) | |
|---|---|
| Polymerizable liquid crystal compound (LC-1-1) | 32.88 |
| Horizontal orientation agent (LC-1-2) | 0.05 |
| Cation photopolymerization initiator (CPI100-P, manufactured by San-Apro) | 0.66 |
| Polymerization controlling agent (IRGANOX1076, manufactured by Ciba Specialty Chemicals Ltd.) | 0.07 |
| Methyl ethyl ketone | 46.34 |
| Cyclohexanone | 20.00 |

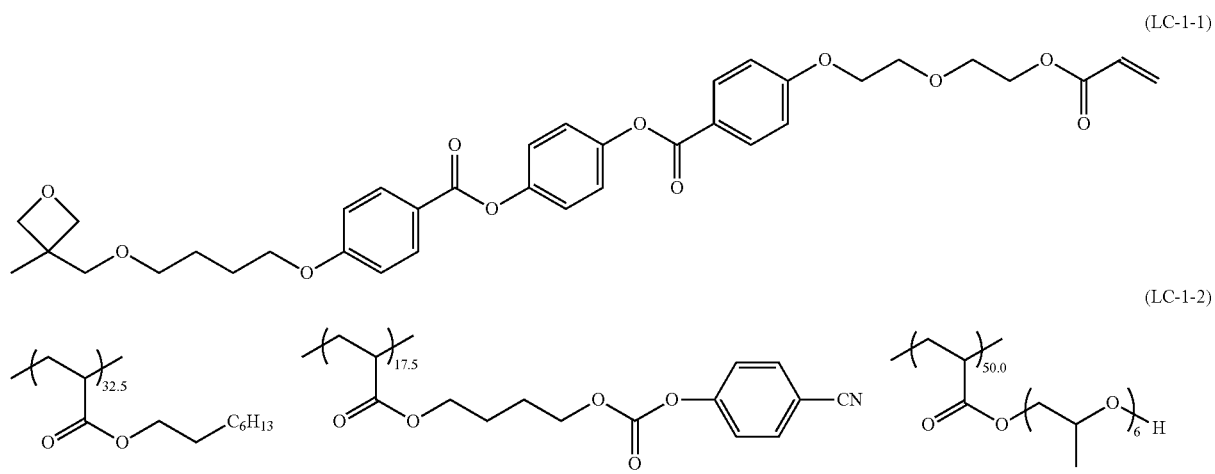

(Preparation of Additive Layer Coating Liquid OC-1)

The composition below was prepared, passed through a polypropylene filter with a 0.2 micrometer pore size, and employed as additive layer coating liquid OC-1. The compound 2-trichloromethyl-5-(p-styrylstyryl)-1,3,4-oxadiazole was employed as radical photopolymerization initiator RPI-1. The following composition is indicated in the amounts used as a coating solution.

| Additive layer coating liquid composition (weight %) | |
|---|---|
| Binder (MH-101-5, FUJIKURA KASEI Co. Ltd.) | 7.63 |
| Radical photopolymerization initiator (RPI-1) | 0.49 |
| Surfactant (MEGAFAC F-176PF manufactured by Dainippon Ink and Chemicals Inc.) | 0.03 |
| Methyl ethyl ketone | 91.85 |

Example 1

Preparation of Birefringence Pattern Builder P-1

A laminate film with adhesive agent of 1 micrometer or less in thickness (HPF25M, manufactured by PANAC Corporation) was bonded to one side of a polyimide film of 25 micrometers in thickness (Kapton 100H, manufactured by Toray DuPont (Ltd.)). Onto the other side of the polyimide film, aluminum was vapor-deposited to 60 nm to fabricate a support with a reflective layer. A wire bar was used to apply orientation layer coating liquid AL-1 on the surface on which the aluminum had been vapor deposited and the coating liquid was dried. The dry film thickness was 0.5 micrometer. After a rubbing treatment of the orientation layer, a wire bar was used to apply optically anisotropic layer coating liquid LC-1. Drying was conducted for 2 minutes at a film surface temperature of 90° C. to achieve a liquid-crystal phase state. The applied layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 4.5-micrometer-thick optically anisotropic layer. The ultraviolet ray employed was 500 mW/cm$^2$ illuminance in the range of UV-A (integrated value in the wavelength between 320 and 400 nm), and 500 mJ/cm$^2$ irradiation energy in the range of UV-A. The retardation of the optically anisotropic layer was 400 nm. The optically anisotropic layer was formed of polymer which was solid at 20° C. Finally, additive layer coating liquid OC-1 was applied on the optically anisotropic layer and dried to form a 0.8 micrometer-thick additive layer, thereby fabricating birefringence pattern builder P-1 of Example 1.

Example 2

Preparation of Birefringence Pattern Builder P-2

Birefringence pattern builder P-2 of Example 2 was prepared in a similar manner to that of Example 1, except a laminate film with adhesive agent of 5 micrometers in thickness (ST25M, manufactured by PANAC Corporation) was used instead of the laminate film with adhesive agent of 1 micrometer or less in thickness (HPF25M, manufactured by PANAC Corporation).

Example 3

Preparation of Birefringence Pattern Builder P-3

Birefringence pattern builder P-3 of Example 3 was prepared in a similar manner to that of Example 1, except a laminate film with adhesive agent of 5 micrometers in thickness (ST50, manufactured by PANAC Corporation) was used instead of the laminate film with adhesive agent of 1 micrometer or less in thickness (HPF25M, manufactured by PANAC Corporation).

Example 4

Preparation of Birefringence Pattern Builder P-4

Birefringence pattern builder P-4 of Example 4 was prepared in a similar manner to that of Example 1, except polyimide film of 38 micrometers in thickness (Kapton 150 EN, manufactured by Toray DuPont (Ltd.)) was used instead of the polyimide film of 25 micrometers in thickness (Kapton 100H, manufactured by Toray DuPont (Ltd.)).

Example 5

Preparation of Birefringence Pattern Builder P-5)

Birefringence pattern builder P-5 of Example 5 was prepared in a similar manner to that of Example 2, except polyimide film of 38 micrometers in thickness (Kapton 150 EN, manufactured by Toray DuPont (Ltd.)) was used instead of the polyimide film of 25 micrometers in thickness (Kapton 100H, manufactured by Toray DuPont (Ltd.)).

Example 6

Preparation of Birefringence Pattern Builder P-6

Birefringence pattern builder P-6 of Example 6 was prepared in a similar manner to that of Example 3, except a polyimide film of 38 micrometers in thickness (Kapton 150 EN, manufactured by Toray DuPont (Ltd.)) was used instead of the polyimide film of 25 micrometers in thickness (Kapton 100H, manufactured by Toray DuPont (Ltd.)).

Example 7

Preparation of Birefringence Pattern Builder P-7

Birefringence pattern builder P-7 of Example 7 was prepared in a similar manner to that of Example 1, except a polyimide film of 18 micrometers in thickness (Kapton 70H, manufactured by Toray DuPont (Ltd.)) was used instead of the polyimide film of 25 micrometers in thickness (Kapton 100H, manufactured by Toray DuPont (Ltd.)).

Example 8

Preparation of Birefringence Pattern Builder P-8

Birefringence pattern builder P-8 of Example 8 was prepared in a similar manner to that of Example 2, except a polyimide film of 18 micrometers in thickness (Kapton 70H, manufactured by Toray DuPont (Ltd.)) was used instead of the polyimide film of 25 micrometers in thickness (Kapton 100H, manufactured by Toray DuPont (Ltd.)).

Example 9

Preparation of Birefringence Pattern Builder P-9

Birefringence pattern builder P-9 of Example 9 was prepared in a similar manner to that of Example 3, except a polyimide film of 18 micrometers in thickness (Kapton 70H, manufactured by Toray DuPont (Ltd.)) was used instead of the polyimide film of 25 micrometers in thickness (Kapton 100H, manufactured by Toray DuPont (Ltd.)).

Comparative Example 1

Preparation of Birefringence Pattern Builder P-10

Aluminum was vapor-deposited to 60 nm onto a polyimide film of 50 micrometers in thickness (Kapton 200H, manufactured by Toray DuPont (Ltd.)) to fabricate a support with a reflective layer. A wire bar was used to apply orientation layer coating liquid AL-1 on the surface on which the aluminum had been vapor deposited and the coating liquid was dried. The dry film thickness was 0.5 micrometer. After a rubbing treatment of the orientation layer, a wire bar was used to apply optically anisotropic layer coating liquid LC-1. Drying was conducted for 2 minutes at a film surface temperature of 90° C. to achieve a liquid-crystal phase state. The applied layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 4.5-micrometer-thick optically anisotropic layer. The ultraviolet ray employed was 500 mW/cm$^2$ illuminance in the range of UV-A (integrated value in the wavelength between 320 and 400 nm), and 500 mJ/cm$^2$ irradiation energy in the range of UV-A. The retardation of the optically anisotropic layer was 400 nm. The optically anisotropic layer was formed of polymer which was solid at 20° C. Finally, additive layer coating liquid OC-1 was applied on the optically anisotropic layer and dried to form a 0.8 micrometer additive layer, thereby fabricating birefringence pattern builder P-10 of Comparative example 1.

Comparative example 2

Preparation of Birefringence Pattern Builder P-11

Birefringence pattern builder P-11 of Comparative example 2 was prepared in a similar manner to that of Comparative example 1, except a polyimide film of 38 micrometers in thickness (Kapton 150 EN, manufactured by Toray DuPont (Ltd.)) was used instead of the polyimide film of 50 micrometers in thickness (Kapton 200H, manufactured by Toray DuPont (Ltd.)).

Comparative Example 3

Preparation of Birefringence Pattern Builder P-12

Birefringence pattern builder P-12 of Comparative example 3 was prepared in a similar manner to that of Comparative example 1, except a polyimide film of 25 micrometers in thickness (Kapton 100H, manufactured by Toray DuPont (Ltd.)) was used instead of the polyimide film of 50 micrometers in thickness (Kapton 200H, manufactured by Toray DuPont (Ltd.)).

Comparative Example 4

Preparation of Birefringence Pattern Builder P-13

Birefringence pattern builder P-13 of Comparative example 4 was prepared in a similar manner to that of Comparative example 1, except a polyimide film of 18 micrometers in thickness (Kapton 70H, manufactured by Toray DuPont (Ltd.)) was used instead of the polyimide film of 50 micrometers in thickness (Kapton 200H, manufactured by Toray DuPont (Ltd.)).

Example 10

Preparation of Patterned Birefringent Product Q-1

Figure 15:
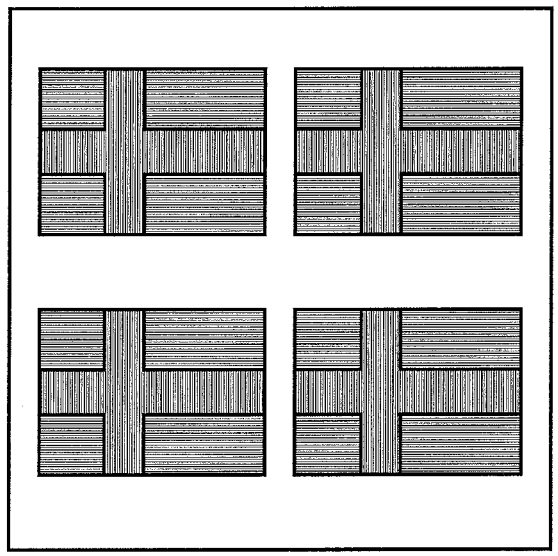
FIG. 15: A diagram showing the pattern of the patterned light exposure conducted in the preparation of patterned birefringent product in Examples.
Figure 16:
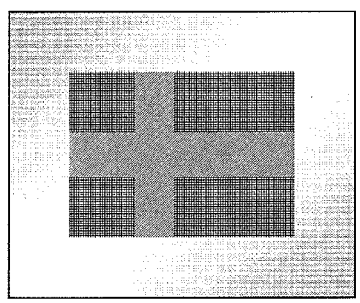
FIG. 16: Enlarged view of the pattern of patterned birefringent products prepared in Examples observed through a polarizing plate.

Birefringence pattern builder P-1 was subjected to a patterned light exposure with exposure levels of 0 mJ/cm$^2$, 8 mJ/cm$^2$, 25 mJ/cm$^2$ as shown in FIG. 15 by using a digital exposure device of laser scanning exposure (INPREX IP-3600H manufactured by FujiFilm Co., Ltd.). The exposure was conducted such that exposure level of the plain colored region in the figure is 0 mJ/cm$^2$, the region with horizontal lines 8 mJ/cm$^2$, and the region with vertical lines 25 mJ/cm$^2$. Subsequently, the laminate file was removed from the birefringence pattern builder, baking was conducted in a clean oven at 230° C. for one hour to produce a patterned birefringent product Q-1. When a polarizing plate (HLC-5618 manufactured by Sanritz Corporation) was superimposed on the product Q-1, the birefringence pattern provided on the product Q-1 was recognized visually at the prescribed direction of the polarizing plate. The enlarged view of the pattern of the product Q-1 observed through a polarizing plate superimposed thereon is shown in FIG. 16. In the Figure, in contrast to the aluminum foil as ground indicating silver, two color pattern including the parts marked with grid pattern indicating dark blue to blue and the parts marked with diagonal lines indicating yellow to orange is observed.

Example 11 to Example 18

Preparations of Patterned Birefringent Products Q-2 to Q-9

Patterned birefringent products Q-2 to Q-9 of Example 11 to Example 18 were prepared in a similar manner to that of Example 10, except birefringence pattern builders P-2 to P-9 were used respectively instead of the birefringence pattern builder P-1.

Comparative Example 5

Preparation of Patterned Birefringent Product Q-10

Birefringence pattern builder P-10 was subjected to a patterned light exposure with exposure levels of 0 mJ/cm$^2$, 8 mJ/cm$^2$, 25 mJ/cm$^2$ as shown in FIG. 15 by using a digital exposure device of laser scanning exposure (INPREX IP-3600H manufactured by FujiFilm Co., Ltd.). The exposure was conducted such that exposure level of the plain colored region in the figure is 0 mJ/cm$^2$, the region with horizontal lines 8 mJ/cm$^2$, and the region with vertical lines 25 mJ/cm$^2$. Subsequently, baking was conducted in a clean oven at 230° C. for one hour to produce a patterned birefringent product Q-10. When a polarizing plate (HLC-5618 manufactured by Sanritz Corporation) was superimposed on the product Q-10, the birefringence pattern provided on the product Q-10 was recognized visually at the prescribed direction of the polarizing plate. The enlarged view of the pattern of the product Q-10 observed through a polarizing plate superimposed thereon is shown in FIG. 16. In the Figure, in contrast to the aluminum foil as ground indicating silver, two color pattern including the parts marked with grid pattern indicating dark blue to blue and the parts marked with diagonal lines indicating yellow to orange is observed.

Comparative Example 6 to Comparative Example 8

Preparations of Patterned Birefringent Products Q-11 to Q-13

Patterned birefringent products Q-11 to Q-13 of Comparative Example 6 to Comparative Example 8 were prepared in a similar manner to that of Comparative Example 5, except birefringence pattern builders P-11 to P-13 were used respectively instead of the birefringence pattern builder P-10.

[Measurement and Evaluation Method]

For each example, measurement and evaluation are conducted as follows.

(1) Measurement of the Roughness of the Back Surface

"Back surface" is the surface that does not coated with the orientation layer, optically anisotropic layer and additive layer of the birefringence pattern builder, when viewed from the support. "Roughness of the back surface" is "the maximum height Rt of the roughness curve". "The maximum height Rt of the roughness curve" can be obtained as follows.

A. By using "Surface Roughness Measuring Instruments SURFCOM 590A manufactured by TOKYO SEIMITU CO., LTD.", the back surface of the birefringence pattern builder is measured only for the part with 4000 mm in length to obtain profile curve as defined by JIS-B0601-1982.

B. The profile curve is applied with a cutoff filter of 2CR characteristic, and a cutoff wave length of 0.800 mm, and roughness curve as defined by JIS-B0601-1982 is obtained.

C. From the above roughness curve, a part with 0.800 mm in standard length in the direction of the average line is cut off and the sum of the maximum value of the peak height and the maximum value of the depth of the valley of the cutoff part is calculated.

D. A to C is repeated ten times, and the average value of the ten of "the sum of the maximum value of the peak height and the maximum value of the depth of the valley" is calculated to obtain "the maximum height Rt of the roughness curve."

The calculation of the maximum height Rt of the roughness curve can be automatically conducted with the internal machinery of "Surface Roughness Measuring Instruments SURFCOM 590A" manufactured by TOKYO SEIMITU CO., LTD.

(2) Evaluation of the Handling Properties

Load of 12.0 N in the direction of the length is applied for 10 minutes to each of the birefringence pattern builders P-1 to P-13 of 50 mm in width and 150 mm in length in the condition warmed up to 80° C. The birefringence pattern builders are cooled to the normal temperature and placed on a flat base. The birefringence pattern builder each is visually observed from the horizontal direction, and the gap between the base and the birefringence pattern builder is evaluated. At the evaluation, no load other than its own weight is applied.

A gap more than 0.5 mm is not present: ◯

A gap of 0.5 mm to 1.0 mm is present: Δ

A gap more than 1.0 mm is present: X (3) Evaluation of the Nonuniformity

Considering the condition at the industrial production in which a roll film is used in a roll to roll manner, the same kinds of birefringence pattern builders are superimposed such that the two sides of the birefringence pattern builders face to the same direction respectively, and left for 168 hours under a pressure of 0.5 kgw/cm$^2$ in the condition of 25° C. and 60% humidity. Sandwiching a polarizing plate (HLC-5618 manufactured by Sanritz Corporation), reflection spectrum of φ3 mm of each of thus prepared birefringence pattern builders P-1 to P-13 is measured with colorimetric spectrometer CM-700d, manufactured from KONICA MINOLTA Inc, and the retardation of each birefringence pattern builder is calculated by fitting, By the above retardation measurement method, the total of 100 retardations are calculated with respect to 10 mm-width and 10 mm-length intervals in the regions of 100 mm-width and 100 mm-length. The nonuniformity is evaluated by the following criteria.

All of the 100 retardations are within 20 nm: ◯

90 or more of the 100 retardations are within 20 nm: Δ

Other than the above two alternatives: X (4) Evaluation of Discrimination Ability of the Real from the False The discrimination ability is determined to be good if the pattern of FIG. 16 becomes visible with a polarizing plate (HLC-5618 manufactured by Sanritz Corporation) superimposed thereon, otherwise the discrimination ability is determined to be bad. In FIG. 16, in contrast that the aluminum foil as ground indicates silver, the parts marked with grid pattern and the parts marked with diagonal lines indicate different colors.

With regard to the birefringence pattern builders of Examples and Comparative Examples, the above measurement and evaluation (1) to (4) are conducted. The results of (1) to (3) are listed in Table 1. The birefringence pattern builders P-1 to P-9 of Examples 1 to 9 showed sufficient handling properties and nonuniformity, However, the birefringence pattern builders P-10 to P-13 of Comparative Examples 1 to 4 showed insufficient nonuniformity, and the birefringence pattern builders P-12 and P-13 of Comparative Examples 3 and 4 showed insufficient handling properties.

The reason for the insufficient nonuniformity of P-10 to P-13 is because the surface and the back surface of the birefringence pattern builders can be easily bonded to each other due to the low roughness of the back surface that was 1.0 micrometer to 1.2 micrometers. The reason for the evaluation Δ of the birefringence pattern builders P-3, P-6, and P-9, albeit the low roughness of the back surface as 1.0 micrometer is because the pressure bonding is lightened by the 5-micrometer-thick adhesive agent layer of the laminate film. The reason for the evaluation Δ of the birefringence pattern builders P-3, P-6, and P-9 is because, although the roughness of the back surface is as high as 2.0 micrometers, the effect of lightening the pressure bonding is reduced with thickness of the adhesive agent layer that is less than 1.0 micrometer.

The reason for the insufficient handling properties of P-12 and P-13 is because the thickness of the base film is low. The reason for evaluation ○ of the birefringence pattern builders P-1 to P-3 and P-7 to P-10 in the handling properties is because the thickness of the film was increased with the laminate film bonded to the base.

The evaluation of discrimination ability of the real from the false (the above (4)) of the birefringent products Q-1 to Q-13 of Examples 10 to 18 and Comparative examples 5 to 8, which were fabricated by using birefringence pattern builders P-1 to P-13 of Examples 1 to 9 and Comparative examples 1 to 4, were all sufficient.

TABLE 1

| | | Birefringence pattern builder | | | | | | | |
| --- | --- | --- | --- | --- | --- | --- | --- | --- | --- |
| | | Laminate film | | | | base | | Evaluation | |
| | | Name | PET Back | PET thickness | Adhesive agent | Name | Base thickness | roughness of the | Handling property | Non-uniformity |
| P-1 | Example 1 | HPF25M | mat | 25 | <1 | Kapton 100H | 25 | 2.0 | ○ | Δ |
| P-2 | Example 2 | ST25M | mat | 25 | 5 | Kapton 100H | 25 | 2.0 | ○ | ○ |
| P-3 | Example 3 | ST50 | normal | 50 | 5 | Kapton 100H | 25 | 1.0 | ○ | Δ |
| P-4 | Example 4 | HPF25M | mat | 25 | <1 | Kapton 150EN | 38 | 2.0 | ○ | ○ |
| P-5 | Example 5 | ST25M | mat | 25 | 5 | Kapton 150EN | 38 | 2.0 | ○ | ○ |
| P-6 | Example 6 | ST50 | normal | 50 | 5 | Kapton 150EN | 38 | 1.0 | ○ | Δ |
| P-7 | Example 7 | HPF25M | mat | 25 | <1 | Kapton 70H | 18 | 2.0 | ○ | Δ |
| P-8 | Example 8 | ST25M | mat | 25 | 5 | Kapton 70H | 18 | 2.0 | ○ | ○ |
| P-9 | Example 9 | ST50 | normal | 50 | 5 | Kapton 70H | 18 | 1.0 | ○ | Δ |
| P-10 | Comparative Example 1 | — | — | — | — | Kapton 200H | 50 | 1.2 | ○ | X |
| P-11 | Comparative Example 2 | — | — | — | — | Kapton 150EN | 38 | 1.1 | Δ | X |
| P-12 | Comparative Example 3 | — | — | — | — | Kapton 100H | 25 | 1.1 | X | X |
| P-13 | Comparative Example 4 | — | — | — | — | Kapton 70H | 18 | 1.0 | X | X |

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

KEY TO THE NUMBERS

101 Patterned optically anisotropic layer
11 (Temporary) support
12 Optically anisotropic layer
13 Reflective layer or semi-transmissive-half-reflective layer
14 Orientation layer
15 Adhesive layer
16 Printed layer
17 Dynamic property control layer
18 Transfer layer
19 Additive layer or surface layer
111 Laminate film

The invention claimed is:

1. A birefringence pattern builder which is used in a method of producing a patterned birefringent product comprising a step of patterned light exposure of an optically anisotropic layer and a step of heating the layer after the light exposure to 50° C. or higher but not higher than 400° C.,
said birefringence pattern builder comprising the optically anisotropic layer, a support, and a laminate film in this order, and
said laminate film comprising an adhesive layer and a laminate substrate in this order from the side of the support,
said adhesive layer bonding the laminate substrate and the support, and having adhesivity easily delaminated from the support after adhesion or adhesivity easily delaminated from the support in a process of preparation of a birefringence pattern using the birefringence pattern builder,
wherein the birefringence pattern builder satisfies either (a) or (b) below:
(a) the average film thickness of the adhesive layer is 1.0 micrometer or more and Rt of the surface of the laminate film opposite to the surface bonded to the support is 1.0 micrometer or more, wherein Rt is the difference between the highest point and the lowest point of a profile curve of the surface;
(b) the average film thickness of the adhesive layer is 1 micrometer or less and Rt of the surface of the laminate film opposite to the surface bonded to the support is 2.0 micrometers or more.

2. The birefringence pattern builder according to claim 1, wherein the average film thickness of the adhesive layer is 1.0 micrometer or more and Rt of the surface of the laminate film opposite to the surface bonded to the support is 1.0 micrometer or more.

3. The birefringence pattern builder according to claim 2, wherein the support comprises a polyimide polymer.

4. The birefringence pattern builder according to claim 2, wherein thickness of the support is 38 micrometers or less.

5. The birefringence pattern builder according to claim 2, wherein thickness of the support is 25 micrometers or less.

6. The birefringence pattern builder according to claim 1, wherein the average film thickness of the adhesive layer is 1 micrometer or less and Rt of the surface of the laminate film opposite to the surface bonded to the support is 2.0 micrometers or more.

7. The birefringence pattern builder according to claim 6, wherein the support comprises a polyimide polymer.

8. The birefringence pattern builder according to claim 6, wherein thickness of the support is 38 micrometers or less.

9. The birefringence pattern builder according to claim 6, wherein thickness of the support is 25 micrometers or less.

10. The birefringence pattern builder according to claim 1, which comprises a reflective layer between the support and the optically anisotropic layer.

11. The birefringence pattern builder according to claim 1, wherein the optically anisotropic layer is a layer that is formed of a composition comprising a liquid-crystal compound having a radically reactive group and a cationically reactive group.

12. The birefringence pattern builder according to claim 11, wherein the radically reactive group is acrylic group and/or methacrylic group and the cationically reactive group is vinyl ether group, oxetanyl group, and/or epoxy group.

13. The birefringence pattern builder according to claim 1, wherein the support comprises a polyimide polymer.

14. The birefringence pattern builder according to claim 1, wherein thickness of the support is 38 micrometers or less.

15. The birefringence pattern builder according to claim 1, wherein thickness of the support is 25 micrometers or less.

16. A method of producing a patterned birefringent product, which comprises steps (1) to (4) below:
(1) forming an optically anisotropic layer on the surface of a support with a laminate film bonded thereto, which is opposite to the surface to which the laminate film is bonded, said laminate film comprising an adhesive layer and a laminate substrate in this order from the side of the support;
(2) subjecting the optically anisotropic layer to patterned light exposure;
(3) heating the layer after the patterned light exposure to 50° C. or higher but not higher than 400° C.; and
(4) delaminating the laminate film;
said adhesive layer bonding the laminate substrate and the support, and having adhesivity easily delaminated from the support after adhesion or adhesivity easily delaminated from the support in a process of preparation of a birefringence pattern using the birefringence pattern builder,
wherein the adhesive layer and the laminate film satisfy either (a) or (b) below:
(a) the average film thickness of the adhesive layer is 1.0 micrometer or more and Rt of the surface of the laminate film opposite to the surface bonded to the support is 1.0 micrometer or more, wherein Rt is the difference between the highest point and the lowest point of a profile curve of the surface;
(b) the average film thickness of the adhesive layer is 1 micrometer or less and Rt of the surface of the laminate film opposite to the surface bonded to the support is 2.0 micrometers or more.

17. The method according to claim 16, wherein the support comprises a polyimide polymer.

18. The method according to claim 16, wherein thickness of the support is 38 micrometers or less.

19. The method according to claim 16, wherein thickness of the support is 25 micrometers or less.

\* \* \* \* \*